(12) United States Patent
Fujita et al.

(10) Patent No.: US 7,829,267 B2
(45) Date of Patent: Nov. 9, 2010

(54) STAMPER, METHOD OF FORMING A CONCAVE/CONVEX PATTERN, AND METHOD OF MANUFACTURING AN INFORMATION RECORDING MEDIUM

(75) Inventors: Minoru Fujita, Tokyo (JP); Mikiharu Hibi, Tokyo (JP)

(73) Assignee: TDK Corporation, Tokyo (JP)

( * ) Notice: Subject to any disclaimer, the term of this patent is extended or adjusted under 35 U.S.C. 154(b) by 239 days.

(21) Appl. No.: 11/653,918

(22) Filed: Jan. 17, 2007

(65) Prior Publication Data
US 2007/0166651 A1 Jul. 19, 2007

(30) Foreign Application Priority Data
Jan. 18, 2006 (JP) .............................. 2006-009377

(51) Int. Cl.
*B29D 17/00* (2006.01)
*G03C 5/00* (2006.01)

(52) U.S. Cl. ...................... 430/321; 430/320; 264/1.33

(58) Field of Classification Search ...................... None
See application file for complete search history.

(56) References Cited

U.S. PATENT DOCUMENTS

| | | | | |
|---|---|---|---|---|
| 4,627,809 | A * | 12/1986 | Okabayashi et al. | ........ 425/555 |
| 5,772,905 | A | 6/1998 | Chou | |
| 6,014,296 | A | 1/2000 | Ichihara et al. | |
| 6,583,957 | B1 | 6/2003 | Takeshita et al. | |
| 6,586,044 | B1 | 7/2003 | Takeshita et al. | |
| 6,748,865 | B2 | 6/2004 | Sakurai et al. | |
| 2003/0043731 | A1 | 3/2003 | Kerfeld et al. | |
| 2004/0191577 | A1 | 9/2004 | Suwa et al. | |
| 2005/0011767 | A1 | 1/2005 | Nakada et al. | |
| 2005/0031778 | A1 * | 2/2005 | Inoue | ...................... 427/163.1 |
| 2005/0045583 | A1 | 3/2005 | Fujita et al. | |
| 2005/0263915 | A1 | 12/2005 | Fujita et al. | |
| 2005/0285308 | A1 | 12/2005 | Hattori et al. | |
| 2007/0023704 | A1 | 2/2007 | Okawa et al. | |
| 2007/0031706 | A1 | 2/2007 | Okawa et al. | |

FOREIGN PATENT DOCUMENTS

| | | |
|---|---|---|
| JP | 9-97419 | 4/1997 |
| JP | 2000-195042 | 7/2000 |
| JP | 2000-334744 | * 12/2000 |
| JP | 2003-157520 | 5/2003 |
| JP | 2004-295989 | 10/2004 |
| JP | 2005-100496 | 4/2005 |
| WO | 2005/029471 | 3/2005 |

OTHER PUBLICATIONS

Translation JP-2000-334744(Dec. 2000).*
English Language Abstract of JP 2003-157520.
English Language Abstract of JP 2000-195042.
English Language Abstract of JP 9-97419.
English Language Abstract of JP 2004-295989.
U.S. Appl. No. 11/610,731 to Hibi et al., filed Dec. 14, 2006.
U.S. Appl. No. 11/677,321 to Fujita et al., filed Feb. 21, 2007.
English Language Abstract of JP 2005-100496.

* cited by examiner

*Primary Examiner*—John A McPherson
*Assistant Examiner*—Anna L Verderame
(74) *Attorney, Agent, or Firm*—Greenblum & Bernstein, P.L.C.

(57) ABSTRACT

A stamper is formed so that a thickness between a concave/convex pattern formation surface, where a concave/convex pattern is formed, and a rear surface gradually decreases in a predetermined area of the stamper. The predetermined area corresponds to an area where pressure is likely to be concentrated when the concave/convex pattern of the stamper is used to form a concave/convex pattern on a substrate. A method of forming a concave/convex pattern uses such stamper, and a method of manufacturing an information recording medium uses a concave/convex pattern formed by such method.

12 Claims, 9 Drawing Sheets

F I G. 1
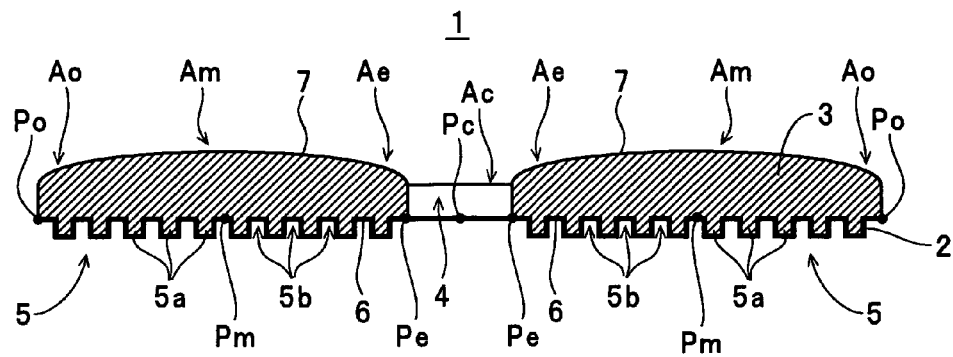
F I G. 2
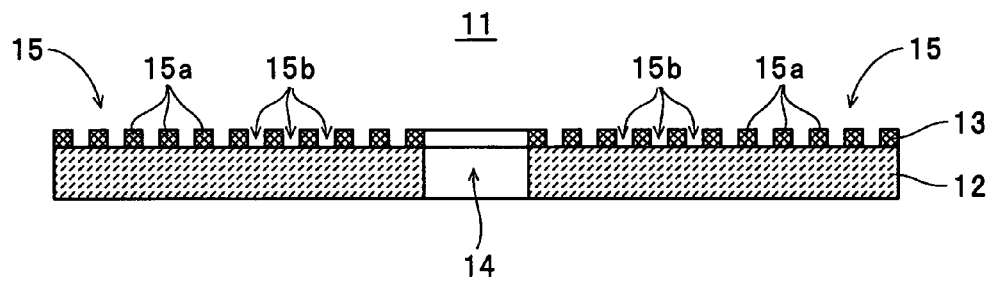
F I G. 3
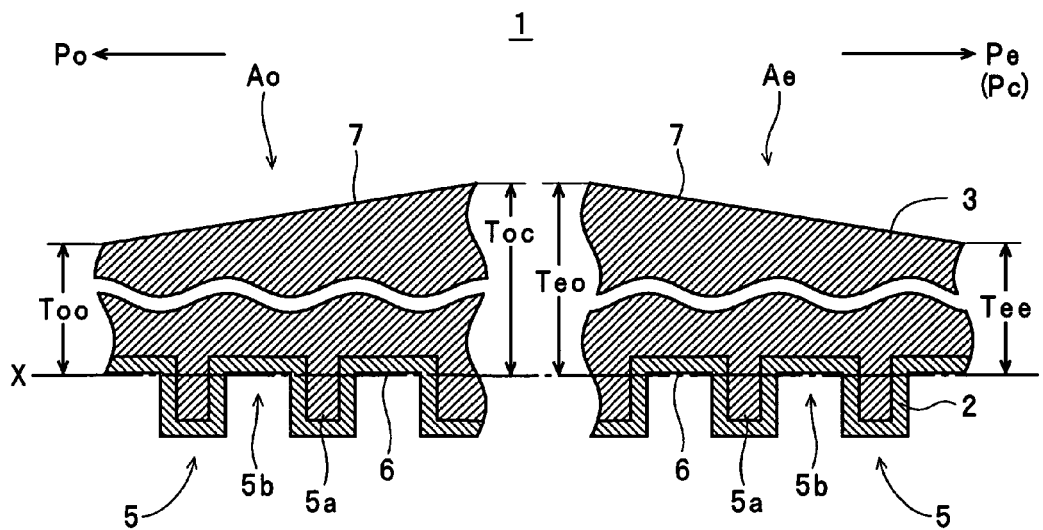

F I G. 2 1
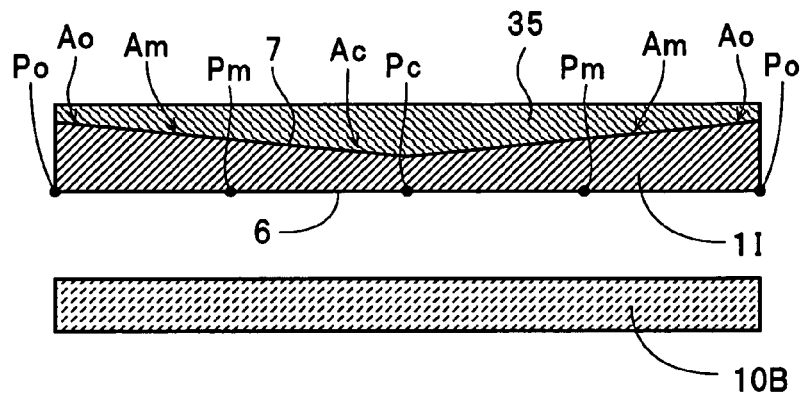
F I G. 2 2
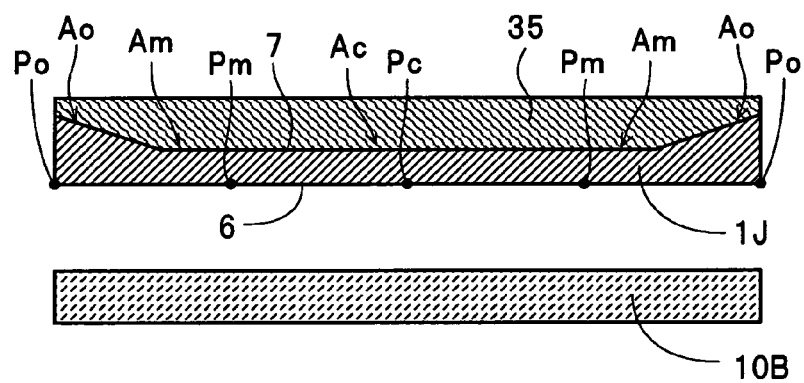
F I G. 2 3
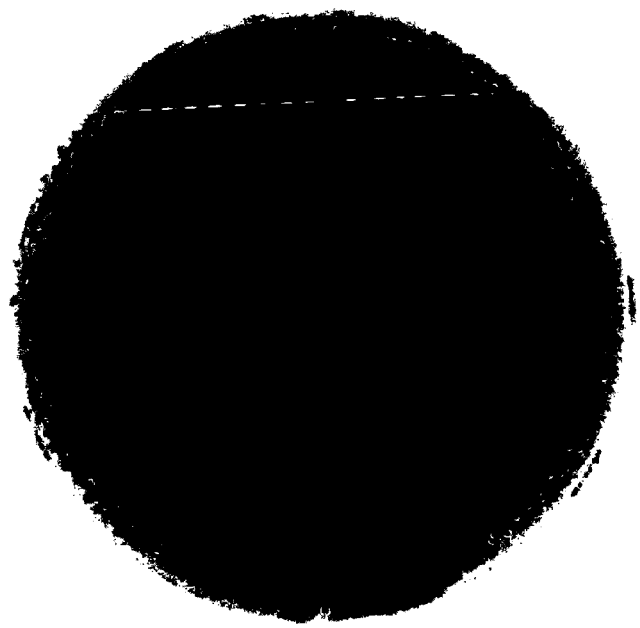

STAMPER, METHOD OF FORMING A CONCAVE/CONVEX PATTERN, AND METHOD OF MANUFACTURING AN INFORMATION RECORDING MEDIUM

BACKGROUND OF THE INVENTION

1. Field of the Invention

The present invention relates to a stamper used to form a concave/convex pattern by imprinting, a method of forming a concave/convex pattern on a substrate using such stamper, and a method of manufacturing an information recording medium using a concave/convex pattern formed according to such method.

2. Description of the Related Art

As one example of a method of forming a concave/convex pattern using this type of stamper, the specification of U.S. Pat. No. 5,772,905 discloses a nano-imprint lithography method (i.e., a method of forming a concave/convex pattern of nanometer size: hereinafter simply "imprinting method") that forms a concave/convex pattern of nanometer size on a substrate by pressing a stamper ("mold") on which a concave/convex pattern of nanometer size has been formed onto a resin layer on a substrate to transfer the concave/convex pattern of the stamper to the resin layer. In this method of forming a concave/convex pattern, polymethyl methacrylate (PMMA: a resin material) is first spin coated on the surface of a substrate made of silicon to form a resin layer ("thin film layer"). Next, after both a multilayer structure, which is composed of the substrate and the resin layer, and the stamper have been heated, as shown in FIG. 1B of the U.S. patent, the entire area of the stamper is pressed onto the resin layer on the substrate with a predetermined pressure. Next, the multilayer structure is left in this state with the stamper pressed thereupon until it reaches room temperature (i.e., a cooling process is carried out), and after this the stamper is separated from the resin layer. By doing so, as shown in FIG. 1C of the U.S. patent, the concave/convex pattern of the stamper is transferred to the resin layer so that concave parts (regions) are formed at the positions where the convex parts were pressed in and convex parts are formed at the positions of the concave parts of the stamper, thereby forming a concave/convex pattern of nanometer size on the substrate (i.e., in the resin layer).

On the other hand, Japanese Laid-Open Patent Publication No. 2003-157520 discloses a method of forming a concave/convex pattern where the occurrence of transfer defects in the concave/convex pattern due to reasons such as tilting of the stamper (matrix) with respect to a base plate to be transferred is avoided by carrying out imprinting in a state where an elastic body (buffer layer) is provided between a stamper and a press and/or between the base plate to be transferred and the press. More specifically, in this method of forming a concave/convex pattern, the base plate to be transferred is set in the press with the surface on which a resin layer (a resist film) is formed facing upward and the stamper is set in the press with the concave/convex pattern formation surface on which the concave/convex pattern to be transferred is formed facing downward. When doing so, an elastic body formed of a soft material such as a PET sheet is sandwiched between the stamper and the press (the press surface), for example. Next, by lowering the stamper toward the base plate to be transferred, the concave/convex pattern of the stamper is pressed onto the resin layer on the base plate to be transferred. When doing so, the elastic body sandwiched between the stamper and the press (the press surface) deforms and therefore tilting of the stamper with respect to the base plate to be transferred and partial warping of the stamper are corrected so that the entire stamper can be pressed onto the resin layer on the base plate to be transferred in a substantially parallel state. By doing so, the concave/convex pattern of the stamper is transferred to the resin layer, thereby forming a concave/convex pattern on the base plate to be transferred.

SUMMARY OF THE INVENTION

However, by investigating these conventional methods of forming a concave/convex pattern, the present inventors found the following problems. In the method of forming a concave/convex pattern disclosed in U.S. Pat. No. 5,772,905, to transfer the concave/convex pattern, the concave/convex pattern is pressed onto the resin layer with a substantially uniform pressing force being applied to the entire stamper. When doing so, the pressure applied to the surface of the resin layer due to the pressing force applied to the stamper becomes concentrated at an outer edge area of the stamper (i.e., an end area located near the outer edge of the stamper) due to no part of the stamper being present further outside than such area. Accordingly, the pressure applied to the surface of the resin layer at the outer edge area is higher compared to an inner area located further inside than the outer edge area. As a result, due to the excessively high pressure applied to the resin layer at the outer edge area, there is the risk of deformation occurring in the concave/convex pattern transferred to the resin layer. Also, when the pressing force applied to the stamper is lowered to only the force that is required at the outer edge area to avoid deformation of the concave/convex pattern, a situation is produced where in the inner area where the pressure applied to the surface of the resin layer is lower compared to the outer edge area, the concave/convex pattern is insufficiently pressed into the resin layer, resulting in the occurrence of transfer defects in the concave/convex pattern. In this way, with the method of forming a concave/convex pattern disclosed by U.S. Pat. No. 5,772,905, there is the risk of deformation and/or transfer defects in the concave/convex pattern due to the difference in the pressure applied to the surface of the resin layer between the outer edge area and the inner area of the stamper. Also, when a center hole is present in either of the stamper and the substrate, when a concave/convex pattern is formed in a resin layer in accordance with the method of forming a concave/convex pattern disclosed by U.S. Pat. No. 5,772,905, the pressure applied to the surface of the resin layer increases not only at the outer edge area described above but also at the rim area of the center hole (i.e., an end area near the rim of the center hole).

On the other hand, in the method of forming the concave/convex pattern disclosed by Japanese Laid-Open Patent Publication No. 2003-157520, imprinting is carried out with an elastic body present between the stamper and the press and/or between the base plate to be transferred (substrate) and the press. When doing so, by sandwiching an elastic body between the stamper and the press, for example, as described earlier it is possible to correct tilting of the stamper with respect to the substrate by causing the elastic body to deform when the stamper is pressed onto the resin layer. However, in this method of forming a concave/convex pattern, when imprinting is carried out with an elastic body present between the stamper and the press, for example, the pressure applied to the surface of the resin layer will be lower at an area where an end area (i.e., outer edge area) of the elastic body and the stamper coincide compared to an area located further inside than such area. This results in a situation where the concave/convex pattern is insufficiently pressed into the resin layer at the area where the end area of the elastic body and the stamper coincide (i.e., transfer defects occur in the concave/convex pattern).

The present inventors found that when imprinting is carried out with an elastic body with a diameter that is equal to or larger than that of the stamper and/or the substrate sandwiched as described above, a phenomenon occurs where there is a difference in the pressure applied to the surface of the resin layer between the outer edge area of the stamper (i.e., the area where the outer edge area of the stamper and the elastic body coincide) and an inner area located further inside than the outer edge area of the stamper. More specifically, when imprinting is carried out with an elastic body with a diameter that is equal to or larger than that of the stamper and/or the substrate provided between the stamper and the press, for example, the pressure applied to the surface of the resin layer is lower in the outer edge area of the stamper compared to the inner area. As a result, the concave/convex pattern is insufficiently pressed into the resin layer in the outer edge area of the stamper, resulting in transfer defects being produced in the concave/convex pattern. On the other hand, if, to avoid the occurrence of transfer defects in the concave/convex pattern, the pressing force applied to the stamper is increased so that sufficient pressure is applied in an area where the end area of the elastic body and the stamper coincide (the case where the elastic body has a smaller diameter than the stamper) or in an area where the outer edge area of the stamper and the elastic body coincide (the case where the elastic body has a diameter that is not smaller than the diameter of the stamper), the pressure applied to the resin layer will become excessively high in an area located further inside than such area (for example, an area that is located further inside than the end area of the elastic body), resulting in the risk of deformation occurring in the concave/convex pattern transferred to the resin layer. Also, if a center hole is present in any of the stamper and the substrate, when a concave/convex pattern is formed in a resin layer according to the method of forming the concave/convex pattern disclosed by Japanese Laid-Open Patent Publication No. 2003-157520, the pressure applied to the surface of the resin layer is lower in the rim area of the center hole compared to an area located further outside than the rim area. In this way, according to the method of forming the concave/convex pattern disclosed by Japanese Laid-Open Patent Publication No. 2003-157520, there is the risk of deformation and/or transfer defects in the concave/convex pattern due to the difference in pressure applied to the surface of the resin layer at different positions on the stamper.

The present invention was conceived in view of the problems described above and it is a principal object of the present invention to provide a stamper, a method of forming a concave/convex pattern, and a method of manufacturing an information recording medium that can avoid deformation and transfer defects in a concave/convex pattern.

A stamper according to the present invention is formed so that a thickness between a concave/convex pattern formation surface, where a concave/convex pattern is formed, and a rear surface gradually decreases in an outer edge area of the stamper toward an outer edge side of the outer edge area.

According to this stamper and a method of forming a concave/convex pattern, described later, that uses this stamper, by forming the stamper so that the thickness between the concave/convex pattern formation surface and the rear surface gradually decreases in the outer edge area (i.e., an end area on the outer edge side of the stamper) toward an outer edge side of the outer edge area, it is possible to avoid a situation where the pressure applied to the surface of a resin layer during formation of a concave/convex pattern (i.e., during imprinting) is concentrated in the outer edge area of the stamper, and therefore it is possible to avoid deformation of the concave/convex pattern in at least the outer edge area. Also, since it is not necessary to lower the pressing force applied to the stamper, it is possible to avoid the occurrence of transfer defects in the concave/convex pattern in an inner area (i.e., an area further inside than the outer edge area). By doing so, it is possible to form the concave/convex pattern with high precision across the entire stamper. Therefore, according to a method of manufacturing an information recording medium, described later, that manufactures an information recording medium using a concave/convex pattern formed in accordance with this method of forming a concave/convex pattern, it is possible to provide an information recording medium where concave/convex patterns are formed with high precision at positions corresponding to both the outer edge area and the inner area of the stamper.

Another stamper according to the present invention has a center hole formed in a center thereof and is formed so that a thickness between a concave/convex pattern formation surface, where a concave/convex pattern is formed, and a rear surface gradually decreases in a rim area of the center hole toward a rim side of the rim area.

According to this stamper and a method of forming a concave/convex pattern, described later, that uses this stamper, by forming the stamper so that the thickness between the concave/convex pattern formation surface and the rear surface gradually decreases in the rim area (i.e., an end area on the center hole side of the stamper) toward the rim, it is possible to avoid a situation where the pressure applied to the surface of a resin layer during formation of a concave/convex pattern is concentrated in the rim area, and therefore it is possible to avoid deformation of the concave/convex pattern in at least the rim area. Also, since it is not necessary to lower the pressing force applied to the stamper, it is possible to avoid the occurrence of transfer defects in the concave/convex pattern in an outer area (i.e., an area further outside than the rim area). By doing so, it is possible to form the concave/convex pattern with high precision across the entire stamper. Therefore, according to a method of manufacturing an information recording medium, described later, that manufactures an information recording medium using a concave/convex pattern formed in accordance with this method of forming a concave/convex pattern, it is possible to provide an information recording medium where concave/convex patterns are formed with high precision at positions corresponding to both the rim area and the outer area of the stamper.

Another stamper according to the present invention is formed so that a thickness between a concave/convex pattern formation surface, where a concave/convex pattern is formed, and a rear surface gradually decreases in at least one of a first area, which is located on an outer edge side of a predetermined area located between an outer edge and a center of the stamper, and a second area, which is located on a center side of the predetermined area, as a distance from a middle position in a radial direction of the predetermined area increases.

According to this stamper and a method of forming a concave/convex pattern, described later, that uses this stamper, by forming the stamper so that in at least one of a first area on the outer edge side of the predetermined area and a second area on the center side of the predetermined area, the thickness between the concave/convex pattern formation surface and the rear surface gradually decreases as the distance from a middle position in the radial direction of the predetermined area increases, as examples it is possible to avoid a situation where the pressure applied to the surface of a resin layer during formation of a concave/convex pattern on a substrate whose diameter is smaller than the diameter of the stamper is concentrated at an area where the outer edge area of the substrate coincides with the stamper (i.e., the outer edge side of the predetermined area), and to avoid a situation where the pressure applied to the surface of a resin layer during formation of a concave/convex pattern on a substrate in which a center hole is formed using a stamper in which a center hole is not formed (or a stamper where the center hole is formed with a smaller diameter than the center hole of the substrate) is concentrated at an area where the rim area of the substrate coincides with the stamper (i.e., the center side of the predetermined area), and therefore deformation of the concave/convex pattern can be avoided in at least such area. Also, since it is not necessary to lower the pressing force applied to the stamper, it is possible to avoid the occurrence of transfer defects in the concave/convex pattern, such as at a middle position of the predetermined area. By doing so, it is possible to form the concave/convex pattern with high precision across the entire stamper including the predetermined area. According to a method of manufacturing an information recording medium, described later, that manufactures an information recording medium using a concave/convex pattern formed by this method of forming a concave/convex pattern, it is possible to provide an information recording medium where concave/convex patterns are formed with high precision, such as at a position corresponding to the predetermined area of the stamper.

Another stamper according to the present invention is formed so that a thickness between a concave/convex pattern formation surface, where a concave/convex pattern is formed, and a rear surface gradually decreases in an outer edge area of the stamper toward a center of the stamper.

According to this stamper and a method of forming a concave/convex pattern, described later, that uses this stamper, by forming the stamper so that the thickness between the concave/convex pattern formation surface and the rear surface gradually decreases in the outer edge area (i.e., an end area on the outer edge side of the stamper) toward the center of the stamper, when an elastic body with a diameter that is equal to or larger than the diameter of the stamper, for example, is used during the formation of a concave/convex pattern, it is possible to avoid a situation where the pressure applied to the surface of a resin layer is concentrated in an inner area (i.e., an area further inside than the outer edge area) of the stamper, and therefore it is possible to avoid deformation of the concave/convex pattern in at least such inner area. Also, since it is not necessary to lower the pressing force applied to the stamper to avoid deformation of the concave/convex pattern, it is possible to avoid the occurrence of transfer defects in the concave/convex pattern in the outer edge area. Also, since the stamper is formed so that the thickness in the outer edge area gradually increases toward the outer edge, when an elastic body with a diameter that is equal to or larger than the diameter of the stamper, for example, is used during the formation of a concave/convex pattern, the distance between the rear surface of the stamper and the press is reduced at a position where the stamper is thick (i.e., the outer edge area), and therefore deformation of the elastic body can be sufficiently reduced. Accordingly, since it is possible to avoid a situation where the pressure applied to the surface of a resin layer falls in the outer edge area of the stamper, it is possible to avoid the occurrence of transfer defects in the concave/convex pattern in the outer edge area. By doing so, the concave/convex pattern can be formed with high precision across the entire stamper. Therefore, according to a method of manufacturing an information recording medium, described later, that manufactures an information recording medium using a concave/convex pattern formed in accordance with this method of forming a concave/convex pattern, it is possible to provide an information recording medium where concave/convex patterns are formed with high precision at positions corresponding to both the inner area and the outer edge area of the stamper.

Another stamper according to the present invention has a center hole formed in a center thereof and is formed so that a thickness between a concave/convex pattern formation surface, where a concave/convex pattern is formed, and a rear surface gradually decreases in a rim area of the center hole toward an outer edge side of the rim area.

According to this stamper and a method of forming a concave/convex pattern, described later, that uses this stamper, by forming the stamper so that the thickness between the concave/convex pattern formation surface and the rear surface gradually decreases in the rim area (i.e., an end area on the center hole side of the stamper) toward the outer edge side of the rim area, when an elastic body, for example, is used during the formation of a concave/convex pattern, it is possible to avoid a situation where the pressure applied to the surface of a resin layer is concentrated in an outer area (i.e., an area further outside than the rim area) of the stamper, and therefore it is possible to avoid deformation of the concave/convex pattern in at least the outer area. Also, since it is not necessary to lower the pressing force applied to the stamper, it is possible to avoid the occurrence of transfer defects in the concave/convex pattern in the rim area. Also, since the stamper is formed so that the thickness in the rim area gradually increases toward the rim, when an elastic body is used when forming the concave/convex pattern, the distance between the rear surface of the stamper and the press is reduced at positions where the stamper is thick (i.e., the rim area) and therefore it is possible to sufficiently reduce deformation of the elastic body. Accordingly, since it is possible to avoid a situation where the pressure applied to the surface of a resin layer falls in the rim area of the stamper, it is possible to avoid the occurrence of transfer defects in the concave/convex pattern in the rim area. By doing so, the concave/convex pattern can be formed with high precision across the entire substrate. Therefore, according to a method of manufacturing an information recording medium, described later, that manufactures an information recording medium using a concave/convex pattern formed in accordance with this method of forming a concave/convex pattern, it is possible to provide an information recording medium where concave/convex patterns are formed with high precision at positions corresponding to both the rim area and the outer area of the stamper.

Another stamper according to the present invention is formed so that a thickness between a concave/convex pattern formation surface, where a concave/convex pattern is formed, and a rear surface gradually decreases in at least one of a first area, which is located on an outer edge side of a predetermined area located between an outer edge and a center of the stamper, and a second area, which is located on a center side of the predetermined area, toward a middle position in a radial direction of the predetermined area.

According to this stamper and a method of forming a concave/convex pattern, described later, that uses this stamper, by forming the stamper so that in at least one of a first area on the outer edge side of the predetermined area and a second area on the center side of the predetermined area, the thickness between the concave/convex pattern formation surface and the rear surface gradually decreases toward a middle position in the radial direction of the predetermined area, as examples, when an elastic body is used during formation of a concave/convex pattern on a substrate whose diameter is smaller than the diameter of the stamper, it is possible to avoid a situation where the pressure applied to the surface of the resin layer is concentrated at an area located closer to the center than an area (first area) where the outer edge area of the substrate coincides with the stamper (i.e., the periphery of a middle position in the predetermined area), and when a concave/convex pattern is formed on a substrate in which a center hole is formed using an elastic body and a stamper in which a center hole is not formed (or a stamper where the center hole is formed with a smaller diameter than the center hole of the substrate), it is possible to avoid a situation where the pressure applied to the surface of the resin layer is concentrated at an area located closer to the outer edge than an area (second area) where the rim area of the substrate coincides with the stamper (i.e., the periphery of the middle position in the predetermined area), and therefore deformation of the concave/convex pattern can be avoided in at least the periphery of the middle position in the predetermined area. Also, since it is not necessary to lower the pressing force applied to the stamper, it is possible to avoid the occurrence of transfer defects in the concave/convex pattern in areas such as an area (first area) where the outer edge area of the substrate coincides with the stamper and an area (second area) where the rim area of the substrate coincides with the stamper. In addition, since the stamper is formed so that the thickness gradually increases in at least one of the first area and the second area as the distance from the middle position increases, when an elastic body is used when forming a concave/convex pattern, the distance between the rear surface of the stamper and the press is reduced at thick parts of the stamper (the first area and the second area), and as a result, deformation of the elastic body can be sufficiently reduced. Accordingly, since it is possible to avoid a situation where the pressure applied to the surface of the resin layer falls in the first area and the second area of the stamper, it is possible to avoid the occurrence of transfer defects in the concave/convex pattern in areas such as an area (first area) where the outer edge area of the substrate coincides with the stamper and an area (second area) where the rim area of the substrate coincides with the stamper. By doing so, the concave/convex pattern can be formed with high precision across the entire stamper including the predetermined area. Therefore, according to a method of manufacturing an information recording medium, described later, that manufactures an information recording medium using a concave/convex pattern formed in accordance with this method of forming a concave/convex pattern, it is possible to provide an information recording medium where concave/convex patterns are formed with high precision at positions corresponding to areas such as the predetermined area of the stamper.

A method of forming a concave/convex pattern according to the present invention comprises pressing any of the stampers described above onto a resin layer formed on a substrate, and transferring the concave/convex pattern of the stamper to the resin layer, thereby forming a concave/convex pattern on the substrate.

A method of manufacturing an information recording medium according to the present invention manufactures an information recording medium using the concave/convex pattern formed on the substrate in accordance with a method of forming a concave/convex pattern described above.

It should be noted that the disclosure of the present invention relates to a content of Japanese Patent Application 2006-9377 that was filed on 18 Jan. 2006 and the entire content of which is herein incorporated by reference.

BRIEF DESCRIPTION OF THE DRAWINGS

These and other objects and features of the present invention will be explained in more detail below with reference to the attached drawings, wherein:

FIG. 1 is a cross-sectional view of a stamper;

FIG. 2 is a cross-sectional view of a magnetic disk;

FIG. 3 is a cross-sectional view of an outer edge area and a rim area of the stamper;

FIG. 21 is a schematic cross-sectional view of yet another stamper, an elastic body, and a preform which is useful in explaining the thicknesses of various parts of the stamper;

FIG. 22 is a schematic cross-sectional view of yet another stamper, an elastic body, and a preform which is useful in explaining the thicknesses of various parts of the stamper;

FIG. 23 is a figure-substitute photograph produced by photographing the pressure distribution during imprinting when using a conventional stamper whose thickness is equal across the entire stamper and an elastic body;

DESCRIPTION OF THE PREFERRED EMBODIMENTS

Figure 4:
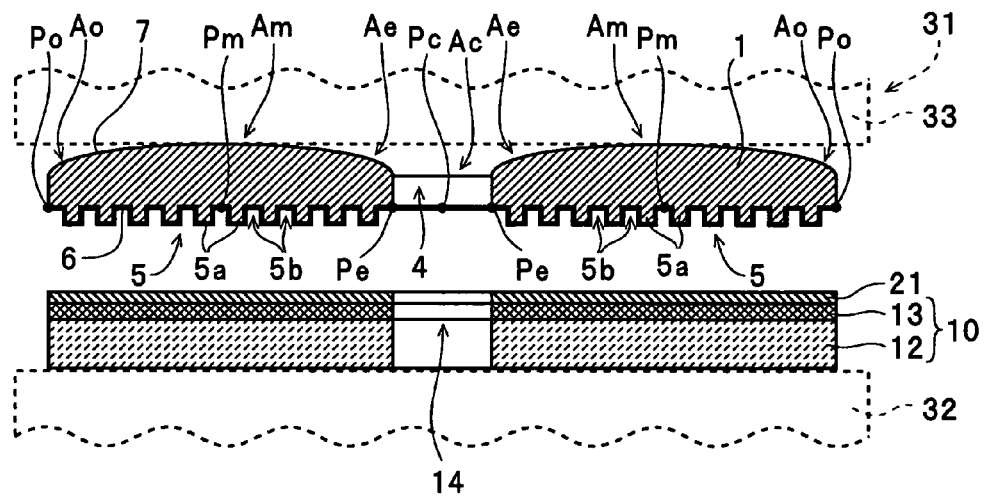
FIG. 4 is a cross-sectional view of a stamper in a state where a resist layer has been formed thereupon and the preform has been set on a substrate attachment portion of a press and the stamper in a state where the stamper has been set on a stamper attachment portion.

Preferred embodiments of a stamper, a method of forming a concave/convex pattern, and a method of manufacturing an information recording medium according to the present invention will now be described with reference to the attached drawings.

The construction of a stamper 1 that is one example of a stamper according to the present invention will now be described with reference to the drawings.

The stamper 1 shown in FIG. 1 is a matrix for manufacturing a magnetic disk 11 (one example of an "information recording medium" for the present invention) shown in FIG. 2 in accordance with a method of manufacturing an information recording medium according to the present invention, and is formed in an overall circular plate-like shape. Here, the magnetic disk 11 is a discrete track-type magnetic recording medium (a "patterned medium") on which data can be recorded by perpendicular recording, for example. As shown in FIG. 2, a recording layer (a magnetic recording layer) 13 is formed on a substrate 12, and a center hole 14 through which a rotational shaft (not shown) of a motor passes is formed in the center of the magnetic disk 11. Note that although in reality a variety of functional layers such as a soft magnetic layer and an intermediate layer are formed between the substrate 12 and the recording layer 13, for ease of understanding the present invention, such layers have been omitted from the description and the drawings. Concave/convex patterns 15 that function as data track patterns and servo patterns are formed in the recording layer 13 of the magnetic disk 11 by forming a plurality of convex parts 15a (magnetic recording areas), at least protruding end parts of which are formed of magnetic material, and a plurality of concave parts 15b (non-recording areas).

On the other hand, as shown in FIG. 3, the stamper 1 is in the overall shape of a thin plate and is constructed by forming a nickel layer 3 on a nickel layer 2 by electroforming using the nickel layer 2 as an electrode. As shown in FIG. 1, a center hole 4 is also formed in a center Pc (a "center area Ac") of the stamper 1. Here, as one example, the stamper 1 is formed so that the diameter (i.e., outer diameter) thereof is equal to the diameter of the magnetic disk 11 described above and the inner diameter of the center hole 4 is equal to the inner diameter of the center hole 14 of the magnetic disk 11. Also, a concave/convex pattern 5 with a plurality of convex parts 5a formed corresponding to the concave parts 15b of the magnetic disk 11 and a plurality of concave parts 5b formed corresponding to the convex parts 15a is formed on a concave/convex pattern formation surface 6 (the lower surface in FIG. 3) of the stamper 1. Note that in the present specification, as shown in FIG. 3, a plane that matches the bottom surfaces of the concave parts 5b in the concave/convex pattern 5 (the plane shown by the dot-dash line X in FIG. 3) is referred to as the concave/convex pattern formation surface 6. Here, depending on the method of manufacturing, in some cases the bottom surfaces of the concave parts 5b do not lie on the same plane, and in this case a plane including the bottom surface of any of the concave parts 5b can be set as the concave/convex pattern formation surface 6. Also, as shown in FIG. 1, the stamper 1 is formed so that the thickness between the concave/convex pattern formation surface 6 on which the concave/convex pattern 5 is formed and a rear surface (the upper surface in FIG. 1) of the stamper 1 gradually decreases in an outer edge area Ao toward an outer edge Po of the stamper 1 and gradually decreases in a rim area Ae (i.e., an area including a rim Pe of the center hole 4) toward the rim Pe (i.e., toward the center Pc).

More specifically, as shown in FIG. 3, the outer edge area Ao of the stamper 1 is formed so as to become gradually thinner from the center Pc side thereof toward the outer edge Po side thereof so that the thickness Too at the outer edge Po side of the outer edge area Ao is thinner than the thickness Toc of the center Pc (the rim Pe) side of the outer edge area Ao. Similarly, the rim area Ae of the stamper 1 is formed so as to become gradually thinner from the outer edge Po side thereof toward the rim Pe side thereof so that the thickness Tee at the rim Pe (the center Pc) side of the rim area Ae is thinner than the thickness Teo of the outer edge Po side of the rim area Ae. As shown in FIG. 1, the stamper 1 is formed so that the thickness between the concave/convex pattern formation surface 6 and the rear surface 7 gradually decreases from a middle position Pm between the outer edge Po and the center Pc (as one example, the exact center between the outer edge Po and the rim Pe) toward the outer edge Po and the thickness gradually decreases from the middle position Pm toward the rim Pe. Accordingly, the thickness is greatest in the middle position Pm (a middle area Am) of the stamper 1. Note that in the drawings referred to by this specification, the difference in thickness between different positions of the stamper has been exaggerated. On the stamper 1 described above, for example, the difference between the thickness of the thickest position (in this example, the thickness at the middle position Pm) and the thickness of the thinnest position (in this example, the thickness at the outer edge Po and at the rim Pe) is around 100 μm. Note that when a construction is used where, like the stamper 1, the thickness in the outer edge area Ao gradually decreases toward the outer edge Po and the thickness in the rim area Ae gradually decreases toward the rim Pe, it is possible for the thickness at the outer edge Po and the thickness at the rim Pe to differ. It is also possible to use a construction where the rate of change of thickness (i.e., the slope of the rear surface 7) in the outer edge area Ao differs to the rate of change of thickness in the rim area Ae.

When manufacturing the stamper 1, first, a nickel layer is formed by depositing nickel on a substrate made of silicon, for example, and a resist layer is formed on the formed nickel layer by spin coating a positive resist. Next, a desired exposure pattern (in this example a pattern corresponding to the convex parts 5a of the stamper 1) is drawn by irradiating the resist layer with an electron beam. After this, positions irradiated with the electron beam (i.e., positions where a latent image is formed) are removed by developing the resist layer to form a concave/convex pattern composed of the resist on the nickel layer. Next, by etching the nickel layer using the concave/convex pattern (i.e., the resist layer) as a mask, a mask pattern composed of a nickel layer is formed on the substrate. After this, by etching the substrate using the nickel layer (mask pattern) on the substrate, a plurality of concave parts (a concave/convex pattern) are formed in the surface of the substrate. By doing so, a matrix for manufacturing a stamper is completed. After this, after the nickel layer 2 (an electrode film) has been formed along the concave/convex form of the concave/convex pattern formed on the matrix, the nickel layer 3 is formed by electrocasting using the nickel layer 2 as an electrode. Next, the multilayer structure composed of the nickel layers 2 and 3 (i.e., the parts that will form the stamper 1) is separated from the matrix. By doing so, the concave/convex pattern of the matrix is transferred to the nickel layers 2 and 3, thereby forming the concave/convex pattern 5.

Next, after an outer edge part and the center part (i.e., the formation position of the center hole 4) of the multilayer structure of the nickel layers 2 and 3 have been removed by punching out, the rear surface side of the concave/convex pattern formation surface 6 where the concave/convex pattern 5 is formed is polished to smooth the rear surface 7. When doing so, by appropriately adjusting the extent to which the respective positions of the rear surface of the multilayer structure are polished, it is possible to produce the desired thickness between the concave/convex pattern formation surface 6 and the rear surface 7 at the various positions of the stamper 1. More specifically, at positions that are to be formed thinner than other positions, the extent of polishing can be increased by increasing the polishing time, by increasing the force applied to the polishing material, by increasing the movement speed of the polishing material with respect to the multilayer structure or the movement speed of the multilayer structure with respect to the polishing material, or by using a polishing material with a larger particle size, for example (i.e., by polishing such positions more than other positions). Next, by forming an adhesion-reducing film by coating the surface of the concave/convex pattern 5 with a fluorine material, the stamper 1 is completed, as shown in FIG. 1.

Next, a method of manufacturing the magnetic disk 11 using the stamper 1 will be described with reference to the drawings.

First, as shown in FIG. 4, a preform 10 (one example of a "substrate" for the present invention) that has a resist layer 21 (one example of a "resin layer" for the present invention) formed on a surface thereof is set on a substrate attachment portion 32 of a press 31. Here, the preform 10 is used to manufacture the magnetic disk 11 and is constructed with the recording layer 13 formed on the substrate 12. Next, the stamper 1 is set on a stamper attachment portion 33 of the press 31 with the concave/convex pattern formation surface 6 facing downward. Here, as one example, a magnet or a vacuum chuck mechanism for holding the stamper 1 is disposed on the stamper attachment portion 33. Note that in FIG. 4 and in FIGS. 5 and 6 described later, the gaps produced between the rear surface 7 of the stamper 1 and the stamper attachment portion 33 are exaggerated.

Figure 5:
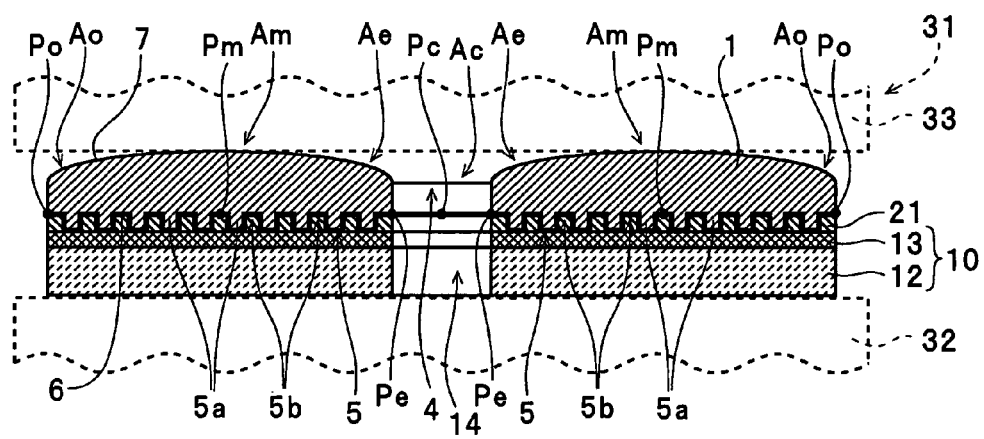
FIG. 5 is a cross-sectional view of the stamper and the preform in a state where a concave/convex pattern is being pressed onto the resist layer.

Next, by lowering the stamper attachment portion 33 toward the substrate attachment portion 32, as shown in FIG. 5, the concave/convex pattern 5 of the stamper 1 is pressed onto the resist layer 21 on the preform 10 mounted on the substrate attachment portion 32. Here, as described earlier, the stamper 1 attached to the stamper attachment portion 33 is formed so that the thickness between the concave/convex pattern formation surface 6 and the rear surface 7 gradually decreases in the outer edge area Ao toward the outer edge Po and gradually decreases in the rim area Ae toward the rim Pe. Accordingly, when a substantially uniform load is applied to the entire stamper 1 (i.e., when a substantially uniform pressing force is applied across the entire stamper 1), at positions where the stamper 1 is thin, the gaps produced between the rear surface 7 and the stamper attachment portion 33 make it difficult for the pressure applied to the surface of the resist layer 21 to increase, and as a result a situation where the pressure is concentrated at end areas such as the outer edge area Ao and the rim area Ae is avoided. Since it is possible to avoid a situation where pressure is concentrated without lowering the pressing force applied to the stamper 1, it is also possible to avoid a situation where the pressure applied to the surface of the resist layer 21 falls in areas (such as the middle position Pm) aside from the outer edge area Ao and the rim area Ae. By doing so, substantially even pressure is applied to the surface of the resist layer 21 across the entire stamper 1 and therefore all of the convex parts 5a formed on the concave/convex pattern formation surface 6 are pressed into the resist layer 21 by the same amount.

Figure 6:
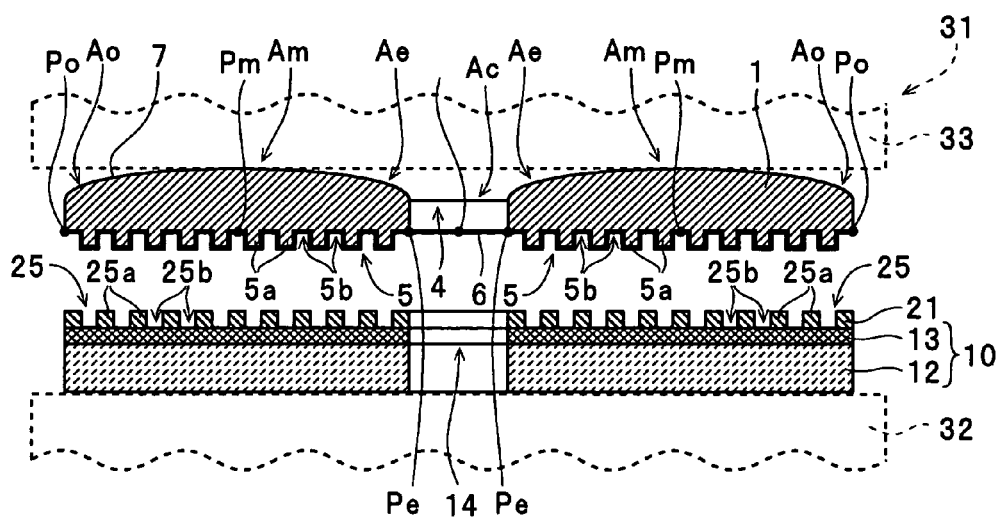
FIG. 6 is a cross-sectional view of the stamper and the preform in a state where the stamper has been separated from the resist layer.

Next, after the state where the stamper 1 is pressed into the resist layer 21 has been maintained for five minutes, for example, as shown in FIG. 6, the stamper attachment portion 33 is raised from the substrate attachment portion 32 to separate the stamper 1 from the resist layer 21. By doing so, as shown in FIG. 6, the concave/convex form of the concave/convex pattern 5 of the stamper 1 is transferred to the resist layer 21 to form a concave/convex pattern 25 on the preform 10. In the concave/convex pattern 25 formed on the preform 10, concave parts 25b are formed corresponding to the convex parts 5a in the concave/convex pattern 5 of the stamper 1 and convex parts 25a are formed corresponding to the concave parts 5b in the concave/convex pattern 5. In this way, the process (imprinting process) that forms the concave/convex pattern 25 using the method of forming a concave/convex pattern according to the present invention is completed.

Next, any resist ("residue": not shown) remaining on the bottom surfaces of the concave parts 25b in the concave/convex pattern 25 in the resist layer 21 on the preform 10 is removed by an oxygen plasma process, for example. After this, by etching the preform 10 (i.e., the recording layer 13) using the concave/convex pattern 25 (i.e., the convex parts 25a) as a mask, the concave/convex patterns 15 are formed on the substrate 12. When doing so, the convex parts 15a are formed corresponding to the convex parts 25a in the concave/convex pattern 25 and the concave parts 15b are formed corresponding to the concave parts 25b in the concave/convex pattern 25. After this, by carrying out another etching process, the resist layer 21 remaining on the recording layer 13 (i.e., on the convex parts 15a) is removed. By doing so, the magnetic disk 11 is completed as shown in FIG. 2, thereby completing the method of manufacturing an information recording medium according to the present invention.

Figure 7:
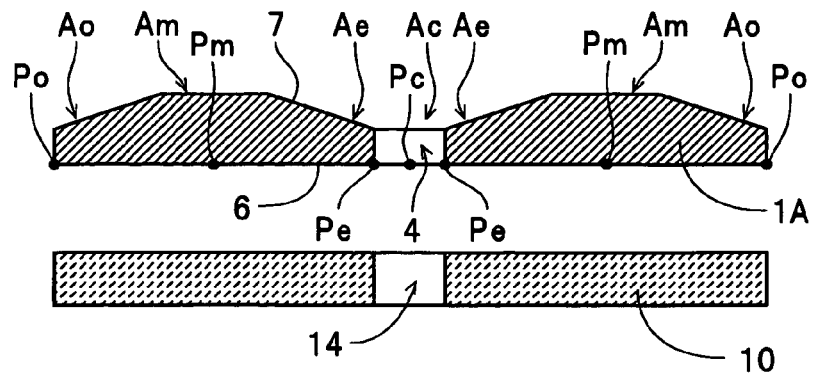
FIG. 7 is a schematic cross-sectional view of another stamper and a preform which is useful in explaining the thicknesses of various parts of the stamper.

Note that during the manufacturing of the magnetic disk 11 described above, although the concave/convex pattern 25 is formed on the preform 10 as a mask pattern using the stamper 1 which is formed so that the thickness between the concave/convex pattern formation surface 6 and the rear surface 7 gradually decreases from the middle position Pm toward the outer edge Po and gradually decreases from the middle position Pm toward the rim Pe, the construction of a stamper that can avoid a situation where the pressure applied to the surface of the resist layer 21 during imprinting is concentrated at an end area such as the outer edge area Ao and the rim area Ae is not limited to this. For example, like a stamper 1A shown in FIG. 7, it is possible to use a construction where the thickness between the concave/convex pattern formation surface 6 and the rear surface 7 is substantially uniform in an area between the outer edge area Ao and the rim area Ae (i.e., in the periphery of the middle position Pm), gradually decreases in the outer edge area Ao toward the outer edge Po, and gradually decreases in the rim area Ae toward the rim Pe. With a stamper 1A that uses this construction, like the stamper 1 described above, it is possible to avoid a situation where the pressure applied to the surface of the resist layer 21 is concentrated at end areas (i.e., the outer edge area Ao and the rim area Ae) without lowering the pressing force applied to the stamper 1A during imprinting and therefore the concave/convex pattern 5 can be uniformly pressed onto the resist layer 21 across the entire range of the stamper. Note that component elements of the stamper 1A and other stampers described later that have the same functions as elements of the stamper 1 have been assigned the same reference numerals and duplicated description thereof has been omitted. Since the methods of manufacturing such stampers 1A to 1M are also the same as the method of manufacturing the stamper 1 described earlier, description thereof is also omitted.

Although examples have been described where the concave/convex pattern 25 is formed using the stampers 1, 1A whose diameters are equal to the diameter of the preform 10, it is also possible to use the stampers 1, 1A to form the concave/convex pattern 25 on a substrate (preform) with a larger diameter than the stampers 1, 1A. In this case, it is possible to press the concave/convex pattern 5 uniformly into the resist layer 21 across the entire stampers 1, 1A while avoiding a situation where the pressure applied to the surface of the resist layer 21 is concentrated in the end areas (the outer edge area Ao and the rim area Ae) of the stampers 1, 1A. Also, although examples have been described where the concave/convex pattern 5 of stampers 1, 1A in which the center hole 4 is formed is pressed into the resist layer 21 on the preform 10 in which the center hole 14 is formed, if the center hole 4 is formed in the stamper, even when the center hole 14 is not formed in the substrate (like the preform 10B shown in FIGS. 8 and 9) or when the center hole of the preform has a smaller diameter than the diameter of the center hole 4 of the stamper (not shown), the stamper should preferably be constructed like the stamper 1 described above so that the thickness gradually decreases in the rim area Ae toward the rim Pe. By using this construction, it is possible to avoid a situation where the pressure applied to the surface of the resist layer 21 is concentrated in the rim area Ae without lowering the pressing force applied to the stamper 1A during imprinting.

Figure 8:
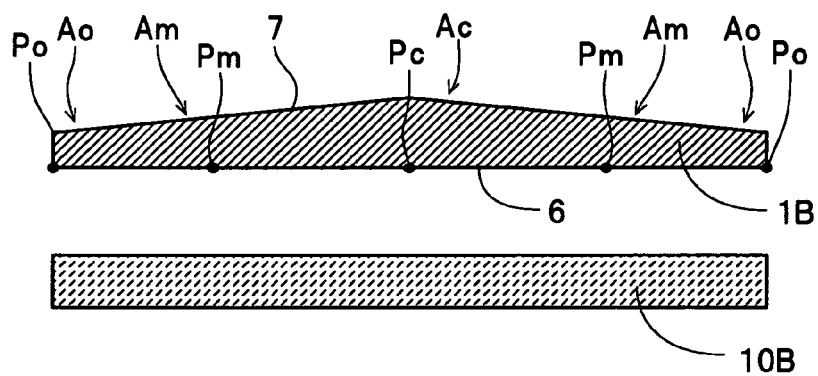
FIG. 8 is a schematic cross-sectional view of yet another stamper and a preform which is useful in explaining the thicknesses of various parts of the stamper.
Figure 9:
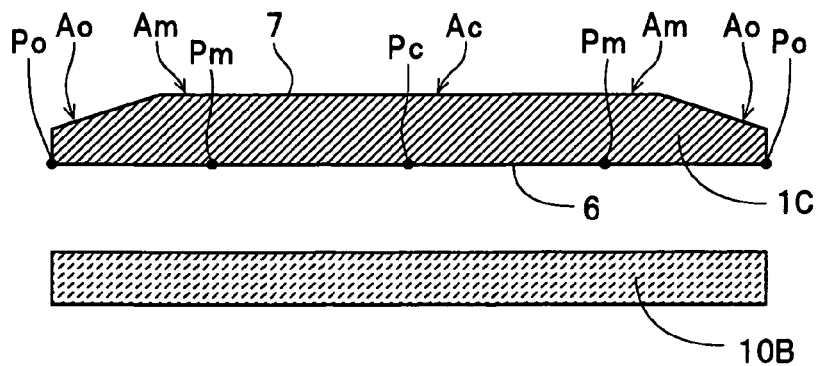
FIG. 9 is a schematic cross-sectional view of yet another stamper and a preform which is useful in explaining the thicknesses of various parts of the stamper.

Also, when the concave/convex pattern 25 is formed on the preform 10B in which the center hole 14 is not formed using a stamper in which the center hole 4 is not formed, it is also possible to use a construction like the stampers 1B, 1C shown in FIGS. 8 and 9 where the thickness gradually decreases from the center Pc to the outer edge Po (FIG. 8) or alternatively is substantially constant (FIG. 9) in a center area Ac and an area corresponding to the rim area Ae of the stamper 1 described above, and where the thickness gradually decreases in the outer edge area Ao toward the outer edge Po. With such constructions, since the center holes 4, 14 are not formed in the stamper 1B, 1C or the preform 10B, the pressure applied to the surface of the resist layer 21 will not be concentrated in an area corresponding to the rim area Ae of the stamper 1 described earlier. As a result, even if a construction where the thickness between the concave/convex pattern formation surface 6 and the rear surface 7 gradually decreases in the periphery of the center Pc toward the center Pc is not used, it is still possible to press the concave/convex pattern 5 uniformly into the resist layer 21 across the entire range of the stampers 1B, 1C.

Figure 10:
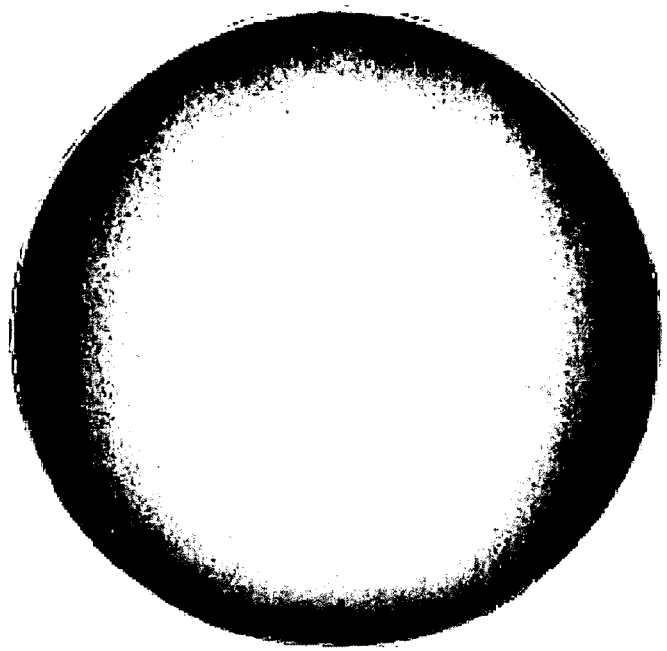
FIG. 10 is a figure-substitute photograph produced by photographing the pressure distribution during imprinting when using a conventional stamper whose thickness is equal across the entire stamper.
Figure 11:
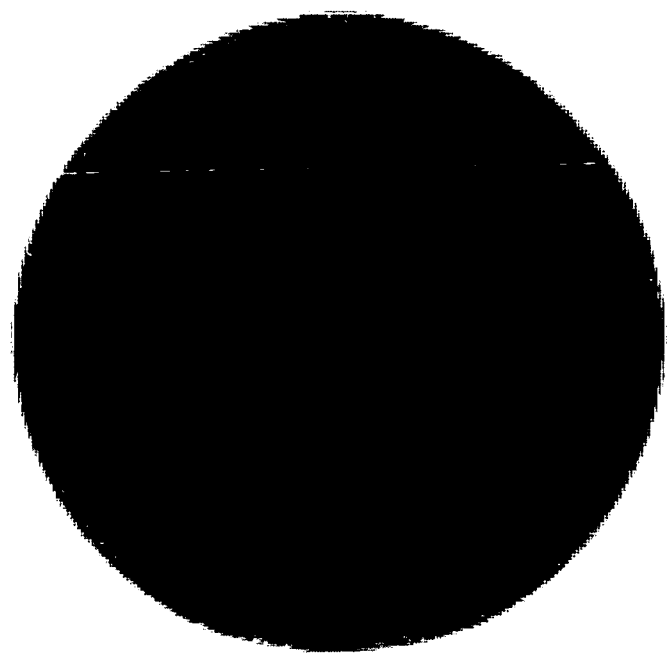
FIG. 11 is a figure-substitute photograph produced by photographing the pressure distribution during imprinting when using the stamper shown in FIG. 8 (or the stamper shown in FIG. 9)

Here, during imprinting using a conventional stamper where the thickness between the concave/convex pattern formation surface and the rear surface is formed substantially uniformly across the entire stamper, as shown in FIG. 10, the pressure applied to the surface of the resin layer (not shown) is concentrated in the end area near the outer edge and increases toward the outer edge. Note that FIG. 10 and FIGS. 11 and 23 described later are pressure distribution photographs produced by carrying out imprinting with pressure-sensitive paper present between the stamper and the substrate to investigate differences in pressure between different areas (i.e., the distribution of pressure applied to the surface of the resin layer) during imprinting and then photographing the pressure-sensitive paper. In these drawings, the darker the color at each position, the higher the applied pressure. On the other hand, when imprinting is carried out using the stampers 1B, 1C described above which are formed so that the thickness in at least the outer edge area Ao gradually decreases toward the outer edge Po, as shown in FIG. 11, the pressure applied to the surface of the resin layer (not shown) is not concentrated in the end areas and a substantially uniform pressure is applied across the entire resin layer. In this way, by making the thickness of the stamper gradually decrease in end areas where the ends of the stamper (the outer edge Po and the rim Pe) coincide with the preform (substrate), it is possible to avoid a situation where the pressure applied to the resin layer during imprinting is concentrated in the end areas without lowering the pressing force applied to the stamper and it is therefore possible to transfer the concave/convex pattern 5 to be transferred to the resist layer 21 with high precision across the entire resist layer 21 without the occurrence of deformation or transfer defects in the concave/convex pattern.

Figure 12:
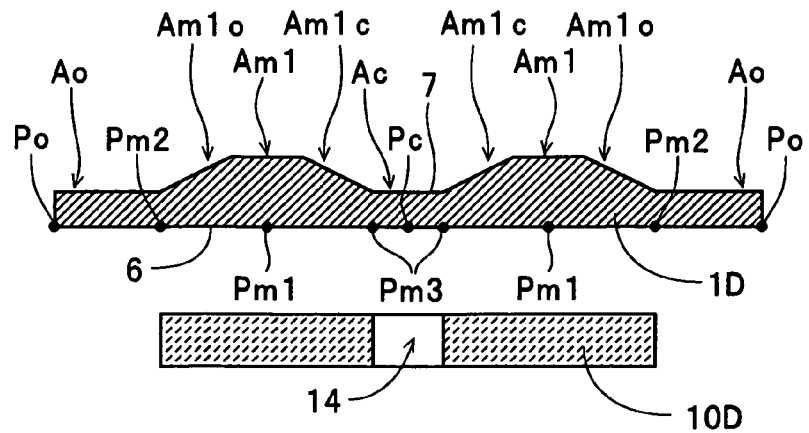
FIG. 12 is a schematic cross-sectional view of yet another stamper and a preform which is useful in explaining the thicknesses of various parts of the stamper.

On the other hand, as shown in FIG. 12, when the diameter (i.e., the outer diameter) of a stamper 1D is larger than the diameter (i.e., the outer diameter) of a preform 10D, during imprinting on the resist layer 21 (not shown) on the preform 10D, the pressure applied to the surface of the resist layer 21 is concentrated in an area where the outer edge area of the preform 10D coincides with the stamper 1D. Also, with the stamper 1D in which the center hole 4 is not formed, during imprinting on the resist layer 21 on the preform 10 in which the center hole 14 is formed, the pressure applied to the surface of the resist layer 21 is concentrated in an area where the rim area of the preform 10D coincides with the stamper 1D. Accordingly, the stamper 1D shown in FIG. 12 is formed so that in a middle area Am1 between the outer edge Po and the center Pc (one example of a "predetermined area" for the present invention), the thickness between the concave/convex pattern formation surface 6 and the rear surface 7 gradually decreases in an area Am1o (one example of a "first area" for the present invention) on the outer edge Po side of the middle area Am1 as the distance increases from a middle position Pm1 in the radial direction of the middle area Am1 (in this example, the middle position Pm1 is a predetermined position which is closer to the center Pc than the middle position Pm of the stamper 1 described earlier) and the thickness between the concave/convex pattern formation surface 6 and the rear surface 7 gradually decreases in an area Am1c (one example of a "second area" for the present invention) on the center Pc side of the middle area Am1 as the distance increases from the middle position Pm1 in the radial direction of the middle area Am1.

More specifically, the stamper 1D is formed so that in the area Am1o, the thickness gradually decreases toward a position Pm2 where the outer edge of the preform 10D coincides with the stamper 1D during imprinting and in the area Am1c, the thickness gradually decreases toward the position Pm3 that coincides with the rim of the center hole 14 of the preform 10D. Accordingly, during imprinting carried out using the stamper 1D, a situation where the pressure applied to the surface of the resist layer 21 is concentrated in areas where the outer edge area of the preform 10D and/or the rim area of the center hole 14 coincide with the stamper 1D is avoided. As a result, it is possible to press the concave/convex pattern 5 with substantially uniform pressure across the entire preform 10D and therefore to transfer the concave/convex pattern 5 with high precision to the resist layer 21. Note that even when a center hole (not shown) with a diameter that is smaller than the inner diameter of the center hole 14 of the preform 10D is formed in the center Pc of the stamper 1D described above, by forming the stamper 1D so that the thickness gradually decreases in the area Am1c within the middle area Am1 toward the position Pm3 that coincides with the rim of the center hole 14 in the preform 10D, it is possible to avoid a situation where pressure applied to the surface of the resist layer 21 is concentrated in the rim area of the preform 10D, and therefore the concave/convex pattern 5 can be transferred with high precision to the resist layer 21 across the entire preform 10D.

When a construction is used where, like the stamper 1D, the thickness gradually decreases in the areas Am1o, Am1c of the middle area Am1 as the distance from the middle position Pm1 increases, the rate of change of the thickness in the areas Am1o, Am1c (that is, the slope of the rear surface 7) may differ between the areas. A construction may also be used where the thickness at the thinnest position in the area Am1o and the thickness at the thinnest position in the area Am1c differ. In addition, the present invention is not limited to a construction like the stamper 1D where the thickness in the periphery of the middle position Pm1 in the middle area Am1 is constant, and it is possible to use a construction where the thickness gradually decreases in the periphery of the middle position Pm1 as the distance from the middle position Pm1 increases.

Figure 13:
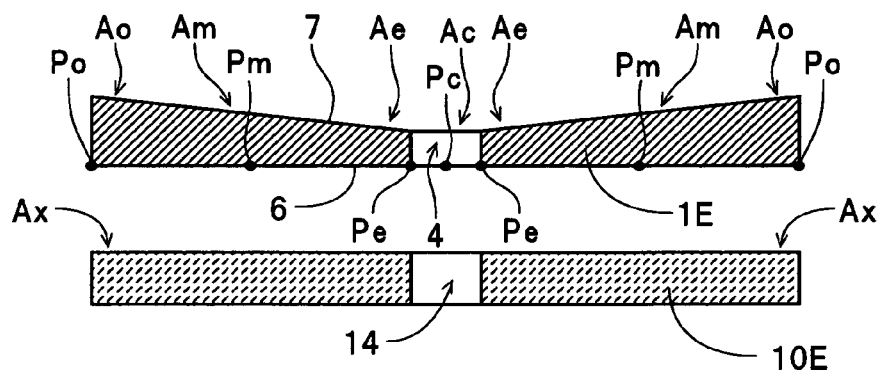
FIG. 13 is a schematic cross-sectional view of yet another stamper and a preform which is useful in explaining the thicknesses of various parts of the stamper.
Figure 14:
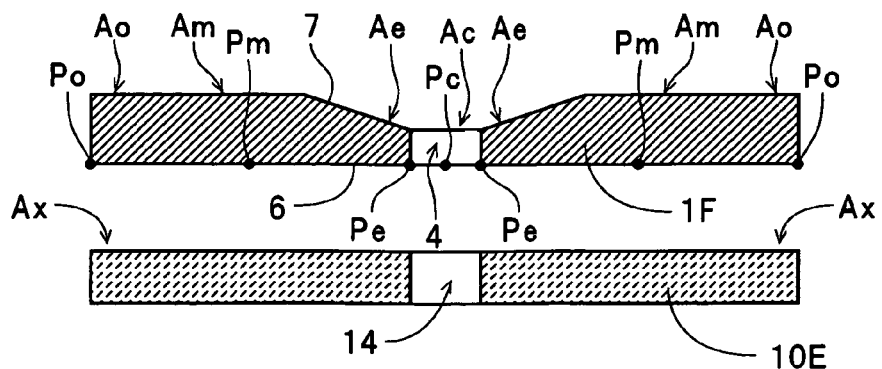
FIG. 14 is a schematic cross-sectional view of yet another stamper and a preform which is useful in explaining the thicknesses of various parts of the stamper.

When an area where transfer defects in the concave/convex pattern are not problematic is present near the outer edge of the preform (substrate) to which the concave/convex pattern 5 is to be transferred, it is possible to use a construction where the thickness does not gradually decrease in the outer edge area Ao of the stamper toward the outer edge Po. More specifically, like the preform 10E shown in FIGS. 13 and 14, when a non-transfer area Ax for which transfer of the concave/convex pattern 5 is not required is present near the outer edge of the preform 10E, like the stampers 1E, 1F shown in FIGS. 13 and 14, it is possible to use a construction where the thickness gradually decreases in at least the rim area Ae toward the rim Pe without the thickness gradually decreasing in the outer edge area Ao toward the outer edge Po. With the stampers 1E and 1F constructed in this way, although the pressure applied to the surface of the resist layer 21 during imprinting on the resist layer 21 of the preform 10E is concentrated in the outer edge area Ao, the non-transfer area Ax for which transfer of the concave/convex pattern 5 is not required is present at the outer edge of the preform 10E. This means that the occurrence of deformation or transfer defects in the concave/convex pattern in the outer edge area Ao is not problematic and a situation where the pressure applied to the surface of the resist layer 21 is concentrated in the rim area Ae is avoided. In this way, it is possible to transfer the concave/convex pattern 5 with high precision to the resist layer 21 in an area to which the concave/convex pattern 5 is to be transferred (i.e., the area located further inside than the non-transfer area Ax).

In this way, according to the stampers 1, 1A to 1C described above and a method of forming a concave/convex pattern using any of the stampers 1, 1A to 1C, by forming the stamper so that the thickness between the concave/convex pattern formation surface 6 and the rear surface 7 gradually decreases in the outer edge area Ao (an "end area") toward the outer edge Po, it is possible to avoid a situation where the pressure applied to the surface of the resist layer 21 during imprinting is concentrated in the outer edge area Ao of the stamper, and therefore deformation of the concave/convex pattern 25 in at least the outer edge area Ao can be avoided. Since it is not necessary to lower the pressing force applied to the stamper 1, 1A to 1C, it is possible to avoid the occurrence of transfer defects in the concave/convex pattern 5 in an inner area (i.e., an area further inside than the outer edge area Ao). By doing so, it is possible to form the concave/convex pattern 25 with high precision across the entire preform 10. Therefore, according to a method of manufacturing an information recording medium that manufactures an information recording medium (the magnetic disk 11) using the concave/convex pattern 25 formed by this method of forming a concave/convex pattern (or alternatively a concave/convex pattern where the positional relationship between the concaves and convexes matches the concave/convex pattern 25) as a mask pattern, it is possible to provide a magnetic disk 11 where the concave/convex patterns 15 are formed with high precision at positions corresponding to both the outer edge area Ao and the inner area of the stampers 1, 1A to 1C.

Also, according to the stampers 1, 1A, 1E, 1F described above and a method of forming a concave/convex pattern using any of the stampers 1, 1A, 1E, 1F, by forming the stamper so that the thickness between the concave/convex pattern formation surface 6 and the rear surface 7 gradually decreases in the rim area Ae (an "end area") toward the rim Pe, it is possible to avoid a situation where the pressure applied to the surface of the resist layer 21 during formation of the concave/convex pattern is concentrated at the rim area Ae of the stampers 1, 1A, 1E, 1F, and therefore deformation of the concave/convex pattern 25 in at least the rim area Ae can be avoided. Since it is not necessary to lower the pressing force applied to the stampers 1, 1A, 1E, 1F, it is possible to avoid the occurrence of transfer defects in the concave/convex pattern 5 in an outer area (i.e., an area further outside than the rim area Ae). By doing so, it is possible to form the concave/convex pattern 25 with high precision across the entire preform 10. Therefore, according to a method of manufacturing an information recording medium that manufactures an information recording medium (the magnetic disk 11) using the concave/convex pattern 25 formed by this method of forming a concave/convex pattern (or alternatively a concave/convex pattern where the positional relationship between the concaves and convexes matches the concave/convex pattern 25) as a mask pattern, it is possible to provide a magnetic disk 11 where the concave/convex patterns 15 are formed with high precision at positions corresponding to both the rim area Ae and the outer area of the stampers 1, 1A, 1E, 1F.

Also, according to the stampers 1, 1A described above and a method of forming a concave/convex pattern using any of the stampers 1, 1A, by forming the stamper so that the thickness between the concave/convex pattern formation surface 6 and the rear surface 7 gradually decreases in the outer edge area Ao toward the outer edge Po and gradually decreases in the rim area Ae toward the rim Pe, it is possible to avoid a situation where the pressure applied to the surface of the resist layer 21 is concentrated at the outer edge area Ao and the rim area Ae (both "end areas") of the stamper without lowering the pressing force applied to the stampers 1, 1A during imprinting. By doing so, it is possible to form the concave/convex pattern 25 with high precision across the entire preform 10 by pressing the concave/convex pattern 5 into the resist layer 21 with uniform pressure across the entire stamper. Also, according to a method of manufacturing an information recording medium that manufactures an information recording medium (the magnetic disk 11) using the concave/convex pattern 25 formed by this method of forming a concave/convex pattern (or alternatively a concave/convex pattern where the positional relationship between the concaves and convexes matches the concave/convex pattern 25) as a mask pattern, it is possible to provide a magnetic disk 11 where the concave/convex patterns 15 are formed with high precision across the entire stamper.

In addition, according to the stamper 1D described above and the method of forming a concave/convex pattern using the stamper 1D, by forming the stamper so that the thickness between the concave/convex pattern formation surface 6 and the rear surface 7 gradually decreases in at least one (in the illustrated example, both) of the area Am1$o$ on the outer edge Po side and the area Am1$c$ on the center Pc side of the "predetermined area" for the present invention (in this example, the middle area Am1) as the distance from the middle position Pm1 increases, as examples it is possible to avoid a situation where the pressure applied to the surface of the resist layer 21 during formation of the concave/convex pattern 25 on a preform 10D whose diameter is smaller than the diameter of the stamper 1D is concentrated at an area where the outer edge area of the preform 10D coincides with the stamper 1D (i.e., the outer edge side of the predetermined area: in this example, the outer edge Po side of the middle area Am1), and to avoid a situation where the pressure applied to the surface of the resist layer 21 during formation of the concave/convex pattern 25 on the preform 10D in which the center hole 14 is formed using a stamper 1D in which the center hole 4 is not formed is concentrated at an area where the rim area of the preform 10D coincides with the stamper 1D (i.e., the center side of the predetermined area: in this example, the center Pc side of the middle area Am1), and therefore deformation of the concave/convex pattern 25 can be avoided in at least such areas (i.e., the outer edge Po side and the center Pc side of the middle area Am1). Also, since it is not necessary to lower the pressing force applied to the stamper 1D, it is possible to avoid the occurrence of transfer defects in the concave/convex pattern 5, such as at the middle position Pm1 of the middle area Am1. By doing so, it is possible to form the concave/convex pattern 25 with high precision across the entire stamper including the middle area Am1. According to a method of manufacturing an information recording medium that manufactures an information recording medium (the magnetic disk 11) using the concave/convex pattern 25 formed by this method of forming a concave/convex pattern (or alternatively a concave/convex pattern where the positional relationship between the concaves and convexes matches the concave/convex pattern 25) as a mask pattern, it is possible to provide a magnetic disk 11 where the concave/convex patterns 15 are formed with high precision, such as at a position corresponding to the middle area Am1 of the stamper 1D.

Next, a stamper 1G and a method of manufacturing the magnetic disk 11 using the stamper 1G will be described with reference to the drawings.

Figure 15:
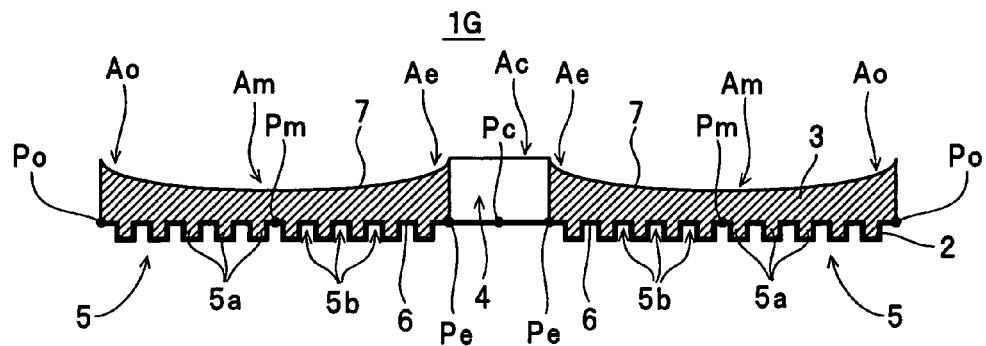
FIG. 15 is a cross-sectional view of yet another stamper.

The stamper 1G shown in FIG. 15 is a matrix for manufacturing the magnetic disk 11 in accordance with the method of manufacturing an information recording medium according to the present invention and corresponds to another example of a "stamper" according to the present invention. Here, as one example, the stamper 1G is formed so that the diameter (outer diameter) thereof is equal to the diameter of the magnetic disk 11 and so that the inner diameter of the center hole 4 is equal to the inner diameter of the center hole 14 of the magnetic disk 11. The stamper 1G is also formed so that the thickness between the concave/convex pattern formation surface 6 and the rear surface 7 (the upper surface in FIG. 15) gradually decreases in the outer edge area Ao toward the center Pc (i.e., toward the rim Pe) and gradually decreases in the rim area Ae (an area that includes the rim Pe of the center hole 4) toward the outer edge Po.

Figure 16:
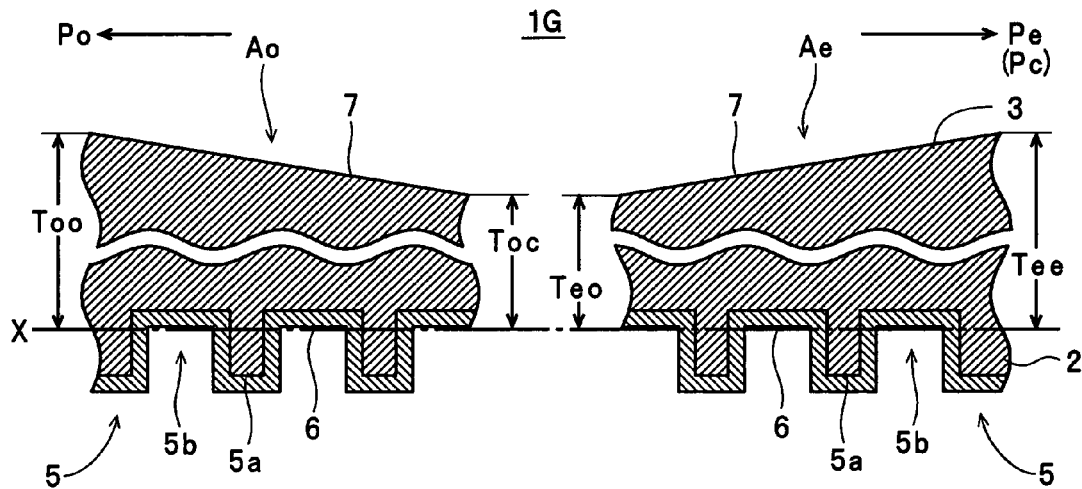
FIG. 16 is a cross-sectional view of an outer edge area and a rim area of the stamper shown in FIG. 15.

More specifically, as shown in FIG. 16, the stamper 1G is formed so that in the outer edge area Ao, the thickness gradually decreases from the outer edge Po side toward the center Pc side, which means that the thickness Toc of the center Pc (the rim Pe) side of the outer edge area Ao is thinner than the thickness Too of the outer edge Po side. In the same way, the stamper 1G is formed so that in the rim area Ae, the thickness gradually decreases from the rim Pe side toward the outer edge Po side, which means that the thickness Teo of the outer edge Po side of the rim area Ae is thinner than the thickness Tee of the rim Pe (the center Pc) side. Here, as shown in FIG. 15, the stamper 1G is formed so that the thickness between the concave/convex pattern formation surface 6 and the rear surface 7 gradually decreases from the outer edge Po toward a middle position Pm between the outer edge Po and the center Pc (as one example, the middle position Pm is the exact center between the outer edge Po and the rim Pe) and gradually decreases from the rim Pe toward the middle position Pm, resulting in the thickness being lowest at the middle position Pm (i.e., in the middle area Am). Here, on the stamper 1G, as one example, the difference between the thickness of the thickest position (in this example, the thickness at the outer edge Po and the rim Pe) and the thickness of the thinnest position (in this example, the thickness at the middle position Pm) is around 100 μm. Note that when a construction is used where, like the stamper 1G, the thickness in the outer edge area Ao gradually decreases toward the center Pc side and the thickness in the rim area Ae gradually decreases toward the outer edge Po side, it is possible for the thickness at the outer edge Po and the thickness at the rim Pe to differ. It is also possible to use a construction where the rate of change of thickness in the outer edge area Ao (i.e., the slope of the rear surface 7 of the outer edge area Ao) differs to the rate of change of thickness in the rim area Ae (i.e., the slope of the rear surface 7 of the rim area Ae).

Next, the method of manufacturing the magnetic disk 11 using the stamper 1G will be described with reference to the drawings.

Figure 17:
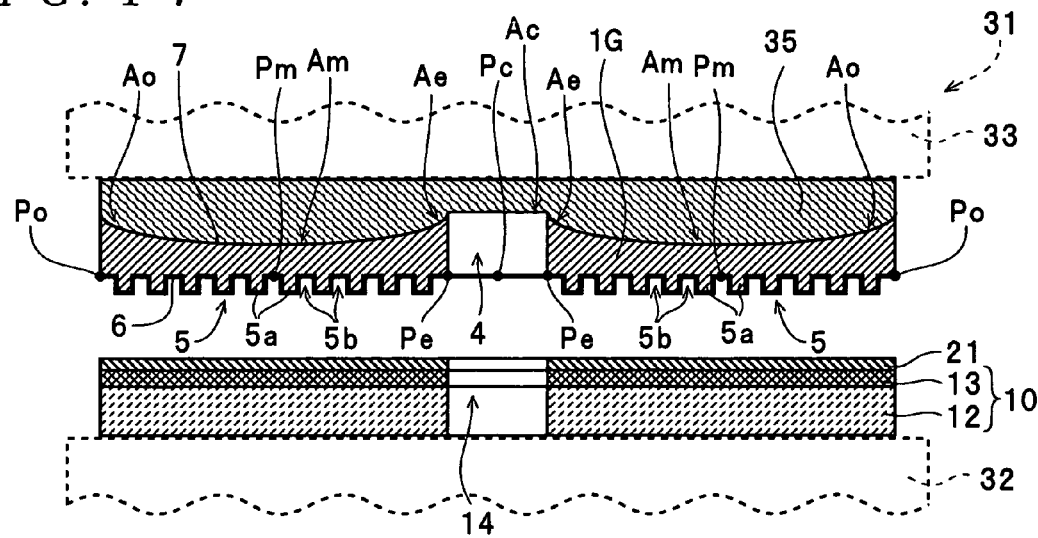
FIG. 17 is a cross-sectional view of a preform in a state where a resist layer has been formed thereupon and the preform has been set on a substrate attachment portion of a press and of a stamper and an elastic body that have been set on a stamper attachment portion.

First, as shown in FIG. 17, the preform 10 that has the resist layer 21 formed on a surface thereof is set on the substrate attachment portion 32 of the press 31 and the stamper 1G is set on the stamper attachment portion 33 of the press 31 with the concave/convex pattern formation surface 6 facing downward. When doing so, the stamper 1G is attached to the stamper attachment portion 33 so that an elastic body 35 formed of a rubber material (such as silicon rubber, nitrile rubber, or ethylene rubber) or a polymer film (such as polyethylene terephthalate, polyethylene naphthalate, or polyimide) is provided between a stamper attachment surface of the stamper attachment portion 33 and the rear surface 7 of the stamper 1G. Here, as one example, a magnet or the like for holding the stamper 1G is disposed on the stamper attachment portion 33. The elastic body 35 sandwiched between the stamper attachment portion 33 and the stamper 1G is formed with a uniform thickness across the entire elastic body 35, for example. Note that in FIG. 17, a state is shown where the elastic body 35 sandwiched between the stamper attachment portion 33 and the stamper 1G has deformed in accordance with the form of the rear surface 7 of the stamper 1G (i.e., a state where the thickness of the elastic body 35 differs in each position so that positions that coincide with thick parts of the stamper 1G have become thinner and positions that coincide with thin parts of the stamper 1G have become thicker). It is also possible to use a construction where an elastic body (not shown) formed so that positions that coincide with parts where the thickness between the concave/convex pattern formation surface 6 and the rear surface 7 is thin are thick and positions that coincide with parts where the thickness between the concave/convex pattern formation surface 6 and the rear surface 7 is thick are thin is sandwiched between the stamper attachment portion 33 and the stamper 1G in place of the elastic body 35 whose thickness is uniform across the entire elastic body 35.

Figure 18:
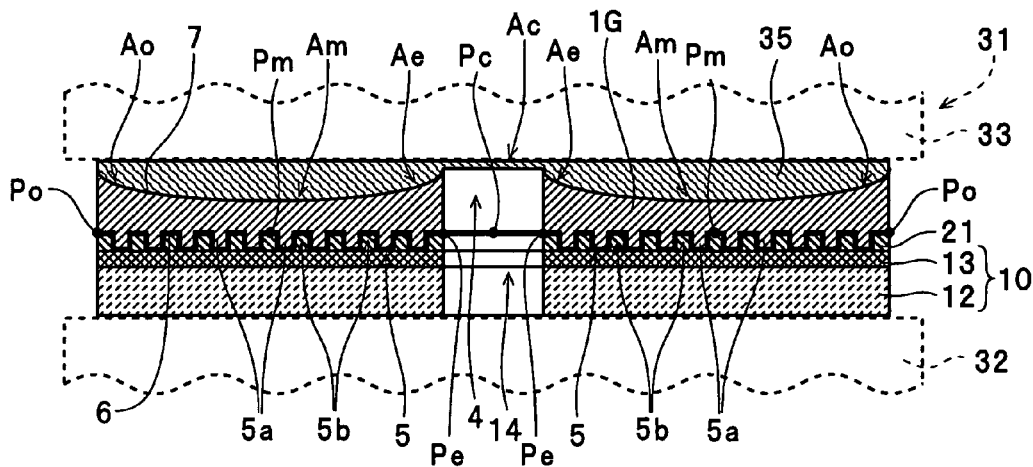
FIG. 18 is a cross-sectional view of the stamper, the elastic body, and the preform in a state where a concave/convex pattern is being pressed onto the resist layer.

Next, by lowering the stamper attachment portion 33 toward the substrate attachment portion 32, as shown in FIG. 18, the concave/convex pattern 5 of the stamper 1G is pressed onto the resist layer 21 on the preform 10 mounted on the substrate attachment portion 32. When doing so, since the elastic body 35 is sandwiched between the stamper attachment portion 33 and the stamper 1G, even if the stamper 1G is slightly tilted with respect to the preform 10 on the substrate attachment portion 32, such tilting will be corrected by deformation of the elastic body 35. Here, as described earlier, the stamper 1G is formed so that the thickness between the concave/convex pattern formation surface 6 and the rear surface 7 gradually decreases in the outer edge area Ao toward the center Pc (the rim Pe) side thereof and gradually decreases in the rim area Ae toward the outer edge Po side thereof. Accordingly, when a substantially uniform load is applied to the entire stamper 1G (i.e., when a substantially uniform pressing force is applied to the entire stamper 1G), at positions where the stamper 1G is thin (i.e., in the area between the outer edge area Ao and the rim area Ae) the elastic body 35 can sufficiently deform due to the large distance between the rear surface 7 and the stamper attachment portion 33. As a result, since it is difficult for pressure to be applied to the surface of the resist layer 21 at positions where the stamper 1G is thin, it is possible to avoid a situation where the pressure applied to the surface of the resist layer 21 is concentrated in an area between the outer edge area Ao and the rim area Ae (such as in the periphery of the middle area Am) without lowering the pressing force applied to the stamper 1.

The stamper 1G is also formed so that the thickness gradually increases in the outer edge area Ao toward the outer edge Po and the thickness gradually increases in the rim area Ae toward the rim Pe. Accordingly, when a substantially uniform load is applied to the entire stamper 1G (i.e., when a substantially uniform pressing force is applied to the entire stamper 1G), at positions where the stamper 1G is thick (i.e., the outer edge area Ao and the rim area Ae), the amount by which the elastic body 35 deforms can be sufficiently reduced due to the small distance between the rear surface 7 and the stamper attachment portion 33. As a result, a situation where the pressure applied to the surface of the resist layer 21 falls in the outer edge area Ao and the rim area Ae of the stamper 1G is avoided. Accordingly, since approximately equal pressure is applied to the surface of the resist layer 21 across the entire stamper 1G, all of the convex parts 5a formed on the concave/convex pattern formation surface 6 are pressed substantially equally into the resist layer 21.

Figure 19:
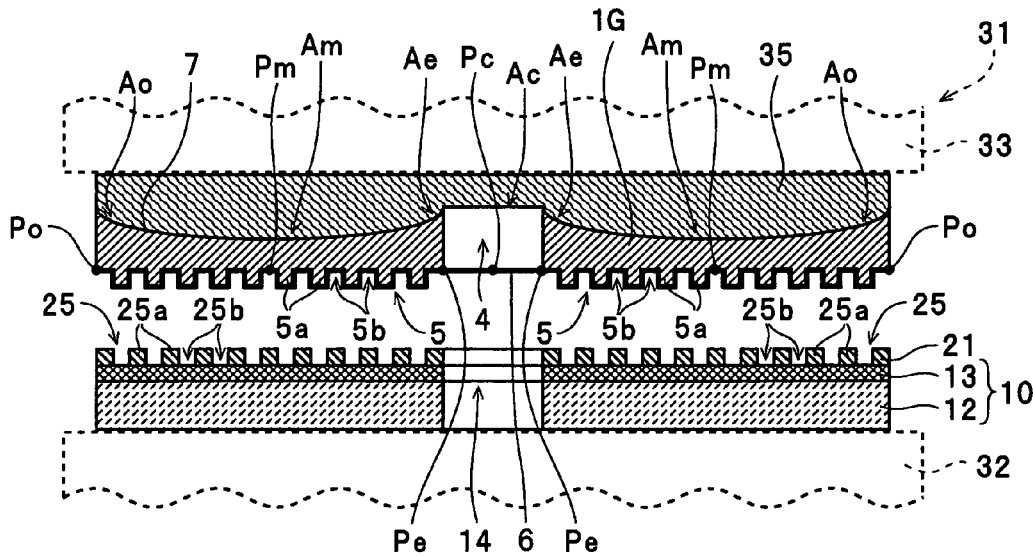
FIG. 19 is a cross-sectional view of the stamper, the elastic body, and the preform in a state where the stamper has been separated from the resist layer.

Next, after the state where the stamper 1G is pressed into the resist layer 21 has been maintained for five minutes, for example, as shown in FIG. 19, the stamper attachment portion 33 is raised from the substrate attachment portion 32 to separate the stamper 1G from the resist layer 21. By doing so, as shown in FIG. 19, the concave/convex form of the concave/convex pattern 5 of the stamper 1G is transferred to the resist layer 21 to form a concave/convex pattern 25 on the preform 10. In the concave/convex pattern 25 formed on the preform 10, concave parts 25b are formed corresponding to the convex parts 5a of the concave/convex pattern 5 of the stamper 1G and convex parts 25a are formed corresponding to the concave parts 5b in the concave/convex pattern 5. In this way, the process (imprinting process) that forms the concave/convex pattern 25 using the method of forming a concave/convex pattern according to the present invention is completed.

Next, any resist ("residue") remaining on the bottom surfaces of the concave parts 25b in the concave/convex pattern 25 in the resist layer 21 on the preform 10 is removed by an oxygen plasma process, for example. After this, by etching the preform 10 (i.e., the recording layer 13) using the concave/convex pattern 25 (i.e., the convex parts 25a) as a mask, the concave/convex patterns 15 are formed on the substrate 12. When doing so, the convex parts 15a are formed corresponding to the convex parts 25a in the concave/convex pattern 25 and the concave parts 15b are formed corresponding to the concave parts 25b in the concave/convex pattern 25. After this, by carrying out another etching process, the resist layer 21 remaining on the recording layer 13 (i.e., on the convex parts 15a) is removed. By doing so, the magnetic disk 11 is completed as shown in FIG. 2, thereby completing the method of manufacturing an information recording medium according to the present invention.

Note that although imprinting is carried out with the elastic body 35 sandwiched between the stamper 1G and the stamper attachment portion 33 during the manufacturing of the magnetic disk 11 described above, the method of forming a concave/convex pattern according to the present invention is not limited to this, and it is possible to form the concave/convex pattern 25 on the resist layer 21 by carrying out imprinting in a state where the elastic body 35 is sandwiched between the preform 10 and the substrate attachment portion 32 without an elastic body 35 being sandwiched between the stamper 1G and the stamper attachment portion 33. Even if the concave/convex pattern 25 is formed according to this method, by using the stamper 1G described above, it is possible to avoid a situation where the pressure applied to the surface of the resist layer 21 falls in the outer edge area Ao and the rim area Ae and a situation where the pressure is concentrated in an area (the periphery of the middle area Am) between the outer edge area Ao and the rim area Ae. In the same way, if imprinting is carried out in a state where elastic bodies 35 are sandwiched between the stamper 1G and the stamper attachment portion 33 and between the preform 10 and the substrate attachment portion 32, by using the stamper 1G described above, it is possible to avoid a situation where the pressure applied to the surface of the resist layer 21 falls in the outer edge area Ao and the rim area Ae and a situation where the pressure is concentrated in an area (the middle area Am, for example) between the outer edge area Ao and the rim area Ae.

Figure 20:
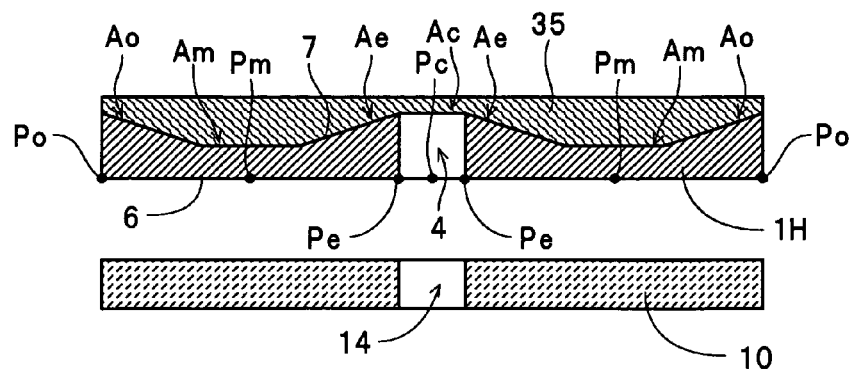
FIG. 20 is a schematic cross-sectional view of yet another stamper, an elastic body, and a preform which is useful in explaining the thicknesses of various parts of the stamper.

Also, although the concave/convex pattern 25 is formed on the preform 10 as a mask pattern using the stamper 1G formed so that the thickness between the concave/convex pattern formation surface 6 and the rear surface 7 gradually decreases from the outer edge Po toward the middle position Pm and gradually decreases from the rim Pe toward the middle position Pm, the construction of a stamper that can avoid a situation where the pressure applied to the surface of the resist layer 21 falls in the outer edge area Ao and the rim area Ae and a situation where the pressure is concentrated in an area between the outer edge area Ao and the rim area Ae when carrying out imprinting in a state where an elastic body 35 is sandwiched between the substrate attachment portion 32 and the substrate for the present invention and/or between the stamper attachment portion 33 and the stamper according to the present invention is not limited to this. For example, like a stamper 1H shown in FIG. 20, it is possible to use a construction where the thickness between the concave/convex pattern formation surface 6 and the rear surface 7 in an area (the periphery of the middle position Pm) between the outer edge area Ao and the rim area Ae is substantially uniform, the thickness gradually decreases in the outer edge area Ao toward the center Pc (the rim Pe) side thereof, and the thickness gradually decreases in the rim area Ae toward the outer edge Po side thereof. With the stamper 1H that uses this construction, like the stamper 1G described above, it is possible to avoid a situation where the pressure applied to the surface of the resist layer 21 is concentrated in an area (an area aside from the end areas) between the outer edge area Ao and the rim area Ae and to press the concave/convex pattern 5 uniformly into the resist layer 21 across the entire stamper without lowering the pressing force applied to the stamper 1G during imprinting.

Although examples have been described where the concave/convex pattern 25 is formed using the stampers 1G, 1H with a diameter that is equal to the diameter of the preform 10, it is also possible to form the concave/convex pattern 25 on a substrate (preform) with a larger diameter than the diameters of the stampers 1G, 1H using the stampers 1G, 1H. In this case, it is possible to avoid a situation where the pressure applied to the surface of the resist layer 21 is concentrated in an area (an area aside from the end areas) between the outer edge area Ao and the rim area Ae of the stampers 1G, 1H, and therefore the concave/convex pattern 5 is pressed uniformly into the resist layer 21 across the entire stamper. In addition, although examples have been described where the concave/convex pattern 5 of the stampers 1G, 1H in which the center hole 4 is formed is pressed onto the resist layer 21 on the preform 10 in which the center hole 14 is formed, in a case where the center hole 4 is formed in the stamper and where during imprinting, the elastic body 35 is sandwiched between the stamper and the stamper attachment portion 33 and/or between the substrate and the substrate attachment portion 32, if the center hole 14 is not formed in the substrate (like the preform 10B shown in FIGS. 21 and 22) or the center hole of the substrate has a smaller diameter than the center hole 4 of the stamper (not shown), like the stamper 1G described above, the stamper should preferably be constructed so that the thickness in the rim area Ae of the stamper gradually decreases toward the outer edge Po. By using this construction, it is possible to avoid a situation where the pressure applied to the surface of the resist layer 21 is concentrated in an outer area that is outside the rim Pe within the rim area Ae without lowering the pressing force applied to the stamper during imprinting.

Also, when the concave/convex pattern 25 is formed on the preform 10B in which the center hole 14 is not formed using a stamper in which the center hole 4 is not formed, like stampers 1I, 1J shown in FIGS. 21 and 22, it is possible to use a construction where in the outer edge area Ao, the thickness gradually decreases toward the center Pc side, and in areas corresponding to the center area Ac and the rim area Ae of the stamper 1G described above the thickness either gradually decreases toward the center Pc or is substantially constant. With this construction, since the center holes 4, 14 are not formed in either the stampers 1I, 1J or the preform 10B, the pressure applied to the surface of the resist layer 21 is not concentrated in an outer area that is outside an area corresponding to the rim area Ae of the stamper 1G described earlier. As a result, even if a construction where the thickness between the concave/convex pattern formation surface 6 and the rear surface 7 gradually decreases toward the outer edge Po in an area corresponding to the rim area Ae is not used, it is still possible to uniformly press the concave/convex pattern 5 onto the resist layer 21 across the entire stampers 1I, 1J.

In this way, when imprinting is carried out using a conventional stamper formed so that the thickness between the concave/convex pattern formation surface and the rear surface is substantially equal across the entire stamper with an elastic body sandwiched between the press and the stamper, for example, as shown in FIG. 23, the pressure applied to the surface of the resin layer (the resist layer) is concentrated and increases in an inner area (i.e., an area further inside than the outer edge area). On the other hand, during imprinting using the stampers 1I, 1J described above that are formed so that the thickness gradually decreases in at least the outer edge area Ao toward the center Pc side, as shown in FIG. 11, the pressure applied to the surface of the resin layer is substantially uniform across the entire surface without the pressure being concentrated in any area. In this way, by using a construction where in end areas where the ends of the stamper (i.e., the outer edge Po and the rim Pe) coincide with the preform (substrate), the thickness gradually decreases as the distance from such ends increases, during imprinting in a state where the elastic body 35 is sandwiched as described above, it is possible to transfer the concave/convex pattern 5 to be transferred to the resin layer with high precision across the entire substrate (preform) while avoiding a situation where the pressure applied to the surface of the resin layer is concentrated in areas (such as the middle area Am) aside from the end areas without lowering the pressing force applied to the stamper.

Figure 24:
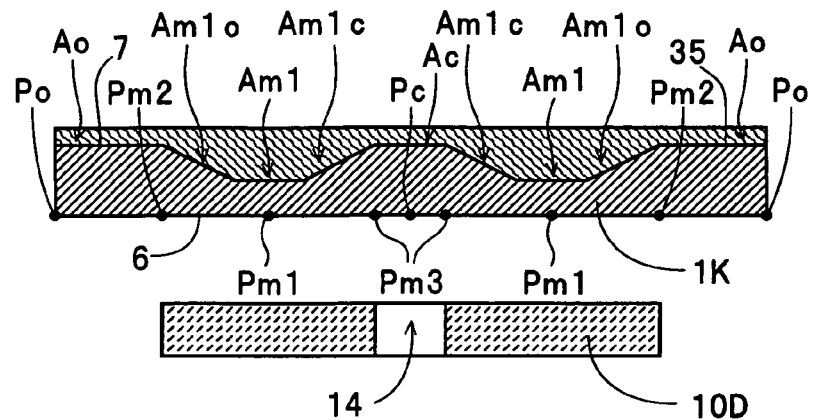
FIG. 24 is a schematic cross-sectional view of yet another stamper, an elastic body, and a preform which is useful in explaining the thicknesses of various parts of the stamper.

On the other hand, as shown in FIG. 24, when the diameter (outer diameter) of the stamper 1K is larger than the diameter (outer diameter) of the preform 10D, during imprinting on the resist layer 21 (not shown) on the preform 10D, the pressure applied to the surface of the resist layer 21 is concentrated in an area where an area located further inside than the outer edge area of the preform 10D coincides with the stamper 1K. With the stamper 1K where the center hole 4 is not formed, during imprinting on the resist layer 21 on the preform 10 in which the center hole 14 is formed, the pressure applied to the surface of the resist layer 21 is concentrated in an area where an area located outside the rim area of the preform 10D coincides with the stamper 1K. Accordingly, the stamper 1K shown in FIG. 24 is formed so that the thickness between the concave/convex pattern formation surface 6 and the rear surface 7 gradually decreases in an area Am1o (one example of a "first area" for the present invention) on the outer edge Po side of the middle area Am1 between the outer edge Po and the center Pc toward a middle position Pm1 in the radial direction of the middle area Am1 (in this example, the middle position Pm1 is a predetermined position which is closer to the center Pc than the middle position Pm of the stamper 1G described earlier) and so that the thickness between the concave/convex pattern formation surface 6 and the rear surface 7 gradually decreases in an area Am1c (one example of a "second area" for the present invention) on the center Pc side of the middle area Am1 toward the middle position Pm1.

More specifically, the stamper 1K is formed so that in the area Am1o, the thickness gradually decreases from a position Pm2, where the outer edge of the preform 10D and the stamper 1K coincide during imprinting, toward the middle position Pm1 in the radial direction of the middle area Am1, and in the area Am1c, the thickness gradually decreases from a position Pm3, where the rim of the center hole 14 and the stamper 1K coincide, toward the middle position Pm1. Accordingly, during imprinting using the stamper 1K, even when the elastic body 35 is sandwiched between the stamper 1K and the stamper attachment portion 33, it is possible to press the concave/convex pattern 5 with a substantially uniform pressure onto the entire preform 10D and therefore to transfer the concave/convex pattern 5 onto the resist layer 21 with high precision without the pressure applied to the surface of the resist layer 21 becoming concentrated in an area where a ring-shaped area (such as the middle position Pm1 of the middle area Am1) between the outer edge area of the preform 10D and the rim area of the center hole 14 coincides with the stamper 1K. Note that even if a center hole (not shown) with a smaller inner diameter than the center hole 14 of the preform 10D is formed in the center Pc of the stamper 1K described above, by forming the stamper 1K so that in an area Am1c in the middle area Am1, the thickness gradually decreases from a position Pm3 where the rim of the center hole 14 in the preform 10D coincides with the stamper 1K toward the middle position Pm1, it is possible to avoid a situation where the pressure applied to the surface of the resist layer 21 is concentrated in an area where an area located further outside than the rim area of the preform 10D coincides with the stamper 1K. As a result, the concave/convex pattern 5 can be transferred to the resist layer 21 with high precision across the entire preform 10D.

Here, when a construction is used where, like the stamper 1K, the thickness gradually decreases in the areas Am1o, Am1c of the middle area Am1 toward the middle position Pm1, it is possible to use a construction where the rate of change of thickness (that is, the slope of the rear surface 7) differs in the areas Am1o, Am1c. It is also possible for the thickness of the thickest part of the area Am1o to differ from the thickness of the thickest part of the area Am1c. In addition, it is possible to use not only a construction where, like the stamper 1K, the thickness is constant in the periphery of the middle position Pm1 of the middle area Am1 but also a construction where the thickness also gradually decreases in the periphery of the middle position Pm1 toward the middle position Pm1.

Also, although an example has been described where an elastic body 35 with an equal diameter to the diameter of the stamper 1K is sandwiched between the stamper attachment portion 33 and the stamper 1K, as one example it is also possible to use a method where imprinting is carried out in a state where an elastic body with an equal diameter to the diameter of the preform 10D (i.e., one example of an elastic body with a smaller diameter than that of the stamper: not shown) is sandwiched between the stamper attachment portion 33 and the stamper 1K. When this method is used, by using the stamper 1K where the thickness gradually increases toward the outer edge Po side of the area Am1o in the middle area Am1, when a substantially uniform load is applied to the entire stamper 1K, at a position where the stamper 1K is thick (the outer edge Po side of the area Am1o: that is, an end area at the outer edge side of the elastic body), the distance between the rear surface 7 and the stamper attachment portion 33 is reduced, and as a result deformation of the elastic body is sufficiently reduced. This means it is possible to avoid a situation where the pressure applied to the surface of the resist layer 21 falls in an end area of the elastic body (i.e., in the area Am1o of the stamper 1K).

In addition, it is possible to use a method of imprinting where an elastic body (not shown) that has a center hole with an inner diameter equal to the inner diameter of the center hole 14 in the preform 10D formed in a center thereof is sandwiched between the stamper attachment portion 33 and the stamper 1K. Even when this method is used, by using the stamper 1K constructed so that the thickness gradually increases in the area Am1c in the middle area Am1 toward the center Pc side, when a substantially uniform load is applied to the entire stamper 1K, the distance between the rear surface 7 and the stamper attachment portion 33 is reduced at a position where the stamper 1K is thick (i.e., at the center Pc side of the area Am1c: that is, an end area on the rim side of the elastic body), and as a result, deformation of the elastic body is sufficiently reduced. This means it is possible to avoid a situation where the pressure applied to the surface of the resist layer 21 falls in an end area of the elastic body (i.e., the area Am1c of the stamper 1K).

Figure 25:
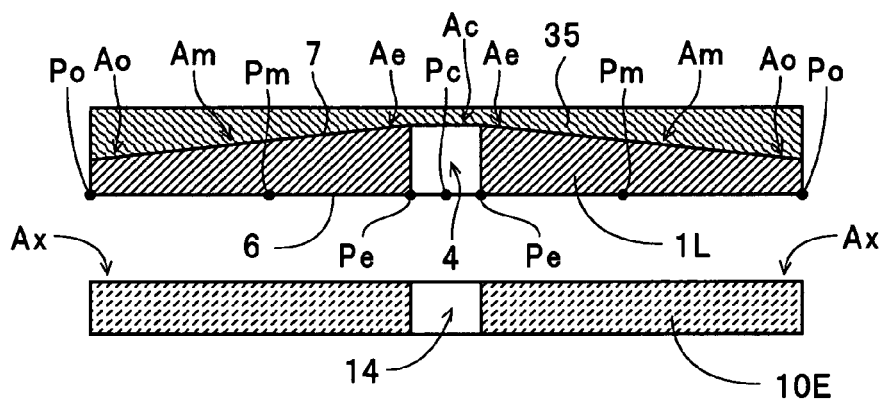
FIG. 25 is a schematic cross-sectional view of yet another stamper, an elastic body, and a preform which is useful in explaining the thicknesses of various parts of the stamper.
Figure 26:
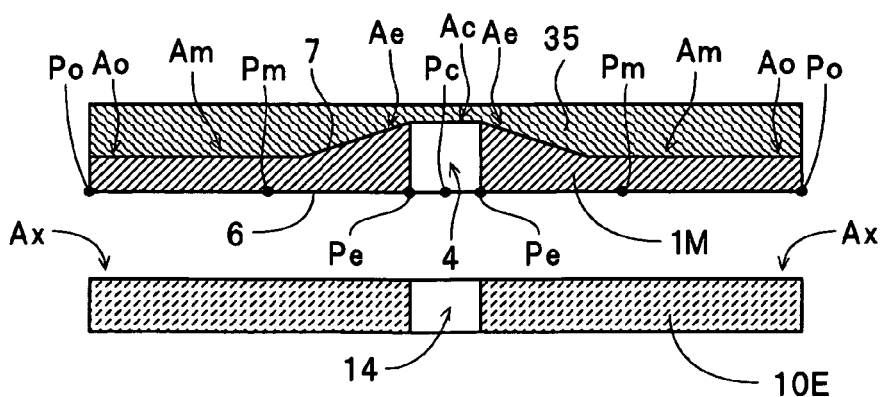
FIG. 26 is a schematic cross-sectional view of yet another stamper, an elastic body, and a preform which is useful in explaining the thicknesses of various parts of the stamper.

Also, when an area where transfer defects in the concave/convex pattern are not problematic is present near the outer edge of the preform (substrate) to which the concave/convex pattern 5 is to be transferred, it is possible to use a construction where the thickness does not gradually decrease in the outer edge area Ao of the stamper toward the center Pc. More specifically, like the preform 10E shown in FIGS. 25 and 26, when a non-transfer area Ax for which transfer of the concave/convex pattern 5 is not required is present near the outer edge of the preform 10E, like the stampers 1L, 1M shown in FIGS. 25 and 26, it is possible to use a construction where the thickness gradually decreases in at least the rim area Ae toward the outer edge Po without the thickness gradually decreasing in the outer edge area Ao toward the center Pc (the rim Pe). With the stampers 1L, 1M constructed in this way, when carrying out imprinting on the resist layer 21 on the preform 10E, although the pressure applied to the surface of the resist layer 21 falls in the outer edge area Ao in a state where the elastic body 35 is sandwiched between the stamper 1K and the stamper attachment portion 33, since the non-transfer area Ax for which transfer of the concave/convex pattern 5 is not required is present at the outer edge of the preform 10E, the occurrence of transfer defects in the concave/convex pattern in the outer edge area Ao is not problematic and a situation where the pressure applied to the surface of the resist layer 21 falls in the rim area Ae is avoided. In this way, it is possible to transfer the concave/convex pattern 5 with high precision to the resist layer 21 in the areas to which the concave/convex pattern 5 is to be transferred (the area located further inside than the non-transfer area Ax).

In this way, according to the stampers 1G to 1J described above and the method of forming a concave/convex pattern using any of the stampers 1G to 1J, by forming the stamper so that the thickness between the concave/convex pattern formation surface 6 and the rear surface 7 gradually decreases in the outer edge area Ao (an "end area") toward the center Pc, when, for example, an elastic body 35 with a diameter that is equal to or larger than the diameters of the stampers 1G to 1J is used during imprinting, it is possible to avoid a situation where the pressure applied to the surface of the resist layer 21 is concentrated in an inner area of the stampers 1G to 1J (i.e., an area located further inside than the outer edge area Ao), and therefore deformation of the concave/convex pattern 25 in at least such inner area can be avoided. Since it is not necessary to lower the pressing force applied to the stampers 1G to 1J to avoid deformation of the concave/convex pattern 25, it is possible to avoid the occurrence of transfer defects in the concave/convex pattern 5 in the outer edge area Ao. Also, since the stampers 1G to 1J are constructed so that the thickness gradually increases in the outer edge area Ao toward the outer edge Po, when an elastic body with a diameter that is equal to or larger than the diameters of the stampers 1G to 1J is used when forming the concave/convex pattern 25, the distance between the rear surface 7 and the stamper attachment portion 33 is reduced at a position (i.e., the outer edge area Ao) where the stampers 1G to 1J are thick, and therefore deformation of the elastic body 35 is sufficiently reduced. Accordingly, it is possible to avoid a situation where the pressure applied to the surface of the resist layer 21 falls in the outer edge area Ao of the stampers 1G to 1J, and as a result, it is possible to avoid the occurrence of transfer defects in the concave/convex pattern 25 in the outer edge area Ao. By doing so, it is possible to form the concave/convex pattern 25 with high precision across the entire resist layer 21. Therefore, according to a method of manufacturing an information recording medium that manufactures an information recording medium (the magnetic disk 11) using the concave/convex pattern 25 formed by this method of forming a concave/convex pattern (or alternatively a concave/convex pattern where the positional relationship between the concaves and convexes matches the concave/convex pattern 25) as a mask pattern, it is possible to provide a magnetic disk 11 where the concave/convex patterns 15 are formed with high precision at positions corresponding to both the inner area and the outer edge area Ao of the stampers 1G to 1J.

In this way, according to the stampers 1G, 1H, 1L, 1M described above and the method of forming a concave/convex pattern using any of the stampers 1G, 1H, 1L, 1M, by forming the stamper so that the thickness between the concave/convex pattern formation surface 6 and the rear surface 7 gradually decreases in the rim area Ae (an "end area") toward the outer edge Po, when, for example, an elastic body 35 is used during imprinting, it is possible to avoid a situation where the pressure applied to the surface of the resist layer 21 is concentrated in an outer area (an area located further outside than the rim Pe) of the stampers 1G, 1H, 1L, 1M, and therefore deformation of the concave/convex pattern 25 in at least such outer area can be avoided. Also, since it is not necessary to lower the pressing force applied to the stamper 1G, 1H, 1L, or 1M, it is possible to avoid the occurrence of transfer defects in the concave/convex pattern 5 in the rim area Ae. In addition, since the stampers 1G, 1H, 1L, and 1M are constructed so that the thickness gradually increases in the rim area Ae toward the rim Pe, if the elastic body 35 is used when forming the concave/convex pattern 25, the distance between the rear surface 7 and the stamper attachment portion 33 is reduced at a position (i.e., the rim area Ae) where the stampers 1G, 1H, 1L, 1M are thick, and therefore deformation of the elastic body 35 can be sufficiently reduced. Accordingly, since it is possible to avoid a situation where the pressure applied to the surface of the resist layer 21 falls in the rim area Ae of the stampers 1G, 1H, 1L, 1M, it is possible to avoid the occurrence of transfer defects in the concave/convex pattern 5 in the rim area Ae. By doing so, it is possible to form the concave/convex pattern 25 with high precision across the entire resist layer 21. Therefore, according to a method of manufacturing an information recording medium that manufactures an information recording medium (the magnetic disk 11) using the concave/convex pattern 25 formed by this method of forming a concave/convex pattern (or alternatively a concave/convex pattern where the positional relationship between the concaves and convexes matches the concave/convex pattern 25) as a mask pattern, it is possible to provide a magnetic disk 11 where the concave/convex patterns 15 are formed with high precision at positions corresponding to both the rim area Ae and the outer area of the stampers 1G, 1H, 1L, 1M.

According to the stampers 1G, 1H formed so that the thickness between the concave/convex pattern formation surface 6 and the rear surface 7 gradually decreases in the outer edge area Ao toward the center Pc (the rim Pe) side thereof and gradually decreases in the rim area Ae toward the outer edge Po side thereof, and the method of forming a concave/convex pattern using any of the stampers 1G, 1H, even when imprinting is carried out with the elastic body 35 sandwiched as described above, it is possible to avoid a situation where the pressure applied to the surface of the resist layer 21 is concentrated in a ring-shaped area (such as the middle area Am) between the outer edge area Ao and the rim area Ae of the stampers 1G, 1H without lowering the pressing force applied to the stampers 1G, 1H. Accordingly, it is possible to press the concave/convex pattern 5 into the resist layer 21 with uniform pressure across the entire resist layer 21, and therefore the concave/convex pattern 25 can be formed with high precision across the entire resist layer 21. Therefore, according to a method of manufacturing an information recording medium that manufactures an information recording medium (the magnetic disk 11) using the concave/convex pattern 25 formed by this method of forming a concave/convex pattern (or alternatively a concave/convex pattern where the positional relationship between the concaves and convexes matches the concave/convex pattern 25) as a mask pattern, it is possible to provide a magnetic disk 11 where the concave/convex patterns 15 are formed with high precision across the entire magnetic disk 11.

In addition, according to the stamper 1K described above and the method of forming a concave/convex pattern using the stamper 1K, by forming the stamper so that in at least one (in this example, both) of a first area (the area Am1o) on the outer edge Po side of the predetermined area for the present invention (in this example, the middle area Am1) and a second area (the area Am1c) on the center Pc side of the predetermined area, the thickness between the concave/convex pattern formation surface 6 and the rear surface 7 gradually decreases toward the center in the radial direction of the predetermined area, it is possible when forming the concave/convex pattern 25 using the elastic body 35 on the preform 10D whose diameter is smaller than the diameter of the stamper 1K, for example, to avoid a situation where the pressure applied to the surface of the resist layer 21 is concentrated at a position (a periphery of the middle position Pm1) closer to the center than the area (the area Am1o) where an outer edge area of the preform 10D coincides with the stamper 1K. Also, when forming the concave/convex pattern 25 on the preform 10D provided with the center hole 14 using the elastic body 35 and a stamper 1K in which no center hole 4 is present (or a stamper 1K where the center hole 4 is formed with a smaller diameter than the diameter of the center hole 14 of the preform 10D), it is possible to avoid a situation where the pressure applied to the surface of the resist layer 21 is concentrated at a position closer to the outer edge (i.e., in the periphery of the middle position Pm1) than the area (the area Am1c) where a rim area of the preform 10D coincides with the stamper 1K. By doing so, it is possible to avoid a situation where the concave/convex pattern 25 is deformed in at least the periphery of the middle position Pm1 in the middle area Am1. Since it is not necessary to lower the pressing force applied to the stamper 1K, it is possible to avoid the occurrence of transfer defects in the concave/convex pattern 5 in areas such as an area (area Am1o) where the outer edge area of the preform 10D coincides with the stamper 1K and an area (area Am1c) where the rim area of the preform 10D coincides with the stamper 1K.

In addition, since the stamper 1K is constructed so that the thickness gradually increases in the first area and the second area (the areas Am1o, Am1c) as the distance from the middle position Pm1 increases, if the elastic body 35 is used when forming the concave/convex pattern 25, the distance between the rear surface 7 and the stamper attachment portion 33 is reduced at positions (the areas Am1o, Am1c) where the stamper 1K is thick. As a result, deformation of the elastic body 35 can be sufficiently reduced. Accordingly, it is possible to avoid a situation where the pressure applied to the surface of the resist layer 21 is reduced in the first area and the second area (the areas Am1o, Am1c) of the stamper 1K, and therefore it is possible to avoid the occurrence of transfer defects in the concave/convex pattern 5 in areas such as an area (the area Am1o) where the outer edge area of the preform 10D coincides with the stamper 1K and an area (the area Am1c) where the rim area of the preform 10D coincides with the stamper 1K. By doing so, it is possible to form the concave/convex pattern 25 with high precision across the entire resist layer 21 including the middle area Am1. Therefore, according to a method of manufacturing an information recording medium that manufactures an information recording medium (the magnetic disk 11) using the concave/convex pattern 25 formed by this method of forming a concave/convex pattern (or alternatively a concave/convex pattern where the positional relationship between the concaves and convexes matches the concave/convex pattern 25) as a mask pattern, it is possible to provide a magnetic disk 11 where the concave/convex patterns 15 are formed with high precision at a position corresponding to the middle area Am1 and the like of the stamper 1K.

Note that the present invention is not limited to the constructions and methods described above. As one example, although a method has been described where the concave/convex pattern 5 is pressed onto the resist layer 21 without an elastic body 35 being sandwiched between the stampers 1, 1A to 1F and the stamper attachment portion 33 and between the preform and the substrate attachment portion 32, it is also possible to use the stampers 1, 1A to 1F described above when imprinting in a state where an elastic body 35 is sandwiched between the stamper attachment portion 33 and the stamper and/or between the substrate attachment portion 32 and the substrate for the present invention (the preform described above). When doing so, by using a stamper constructed so that the thickness gradually decreases toward positions where the pressure applied to the surface of the resist layer 21 is concentrated (i.e., when using any of the stampers 1, 1A to 1F), it is possible to avoid a situation where the pressure applied to the surface of the resist layer 21 is concentrated in any of the areas, without lowering the pressing force applied to the stamper, and therefore the concave/convex pattern 25 can be formed with high precision without leading to deformation across the entire stamper.

Although a method has been described where the concave/convex pattern 5 is pressed onto the resist layer 21 during imprinting using the stampers 1G to 1M in a state where the elastic body 35 is sandwiched between the stampers 1G to 1M and the stamper attachment portion 33, it is possible to use the stampers 1G to 1M described above even when carrying out imprinting in a state where an elastic body 35 is not provided neither between the stamper attachment portion 33 and the stamper nor between the substrate attachment portion 32 and the substrate (the preform described above) for the present invention. When doing so, by using a stamper constructed so that the thickness gradually increases toward a position where the convex parts 5a are insufficiently pressed in (i.e., any of the stampers 1G to 1M), it is possible to avoid a situation where the pressure applied to the surface of the resist layer 21 falls in any of the areas and therefore it is possible to form the concave/convex pattern 25 with high precision without leading to transfer defects in the concave/convex pattern 5 across the entire stamper.

In addition, although examples where nickel is used as the material of the stampers 1 to 1M have been described, the stamper according to the present invention is not limited to this and it is possible to manufacture the stampers from other materials such as resin.

What is claimed is:

1. A stamper comprising a center hole formed in a center of the stamper, the stamper being formed so that a thickness between a concave/convex pattern formation surface, where a concave/convex pattern is formed, and a rear surface gradually decreases in an outer edge area of the stamper toward an outer edge side of the outer edge area and gradually decreases in a rim area of the center hole toward a rim side of the rim area of the center hole.

2. A stamper formed so that a thickness between a concave/convex pattern formation surface, where a concave/convex pattern is formed, and a rear surface gradually decreases in both of a first area, which is located on an outer edge side of a predetermined area located between an outer edge and a center of the stamper, and a second area, which is located on a center side of the predetermined area, as a distance from a middle position in a radial direction of the predetermined area increases.

3. A stamper comprising a center hole formed in a center of the stamper, the stamper being formed so that a thickness between a concave/convex pattern formation surface, where a concave/convex pattern is formed, and a rear surface gradually decreases in an outer edge area of the stamper toward a center of the stamper and gradually decreases in a rim area of the center hole toward an outer edge side of the outer edge area.

4. A stamper formed so that a thickness between a concave/convex pattern formation surface, where a concave/convex pattern is formed, and a rear surface gradually decreases in both of a first area, which is located on an outer edge side of a predetermined area located between an outer edge and a center of the stamper, and a second area, which is located on a center side of the predetermined area, toward a middle position in a radial direction of the predetermined area.

5. A method of forming a concave/convex pattern, the method comprising:
    pressing the stamper according to claim 1 onto a resin layer formed on a substrate; and
    transferring the concave/convex pattern of the stamper to the resin layer, thereby forming a concave/convex pattern on the substrate.

6. A method of forming a concave/convex pattern, the method comprising:
    pressing the stamper according to claim 2 onto a resin layer formed on a substrate; and
    transferring the concave/convex pattern of the stamper to the resin layer, thereby forming a concave/convex pattern on the substrate.

7. A method of forming a concave/convex pattern, the method comprising:
    pressing the stamper according to claim 3 onto a resin layer formed on a substrate; and
    transferring the concave/convex pattern of the stamper to the resin layer, thereby forming a concave/convex pattern on the substrate.

8. A method of forming a concave/convex pattern, the method comprising:
    pressing the stamper according to claim 4 onto a resin layer formed on a substrate; and
    transferring the concave/convex pattern of the stamper to the resin layer, thereby forming a concave/convex pattern on the substrate.

9. A method of manufacturing an information recording medium that manufactures an information recording medium using the concave/convex pattern formed on the substrate in accordance with the method of forming a concave/convex pattern according to claim 5.

10. A method of manufacturing an information recording medium that manufactures an information recording medium using the concave/convex pattern formed on the substrate in accordance with the method of forming a concave/convex pattern according to claim 6.

11. A method of manufacturing an information recording medium that manufactures an information recording medium using the concave/convex pattern formed on the substrate in accordance with the method of forming a concave/convex pattern according to claim 7.

12. A method of manufacturing an information recording medium that manufactures an information recording medium using the concave/convex pattern formed on the substrate in accordance with the method of forming a concave/convex pattern according to claim 8.

* * * * *